(12) United States Patent
Suzuki et al.

(10) Patent No.: US 8,427,551 B2
(45) Date of Patent: Apr. 23, 2013

(54) SOLID-STATE IMAGING DEVICE, IMAGING APPARATUS, AND AD CONVERSION GAIN ADJUSTING METHOD

(75) Inventors: Atsushi Suzuki, Kanagawa (JP); Yoshikazu Nitta, Tokyo (JP)

(73) Assignee: Sony Corporation (JP)

( * ) Notice: Subject to any disclaimer, the term of this patent is extended or adjusted under 35 U.S.C. 154(b) by 441 days.

(21) Appl. No.: 12/570,701

(22) Filed: Sep. 30, 2009

(65) Prior Publication Data

US 2010/0079611 A1 Apr. 1, 2010

(30) Foreign Application Priority Data

Oct. 1, 2008 (JP) ................................. 2008-256267

(51) Int. Cl.
*H04N 5/228* (2006.01)
*H04N 9/73* (2006.01)
*H04N 3/14* (2006.01)

(52) U.S. Cl.
USPC ...................... 348/223.1; 348/222.1; 348/294

(58) Field of Classification Search .................. None
See application file for complete search history.

(56) References Cited

U.S. PATENT DOCUMENTS

| | | | |
|---|---|---|---|
| 7,760,258 B2 * | 7/2010 | Huang et al. ................... | 348/294 |
| 2005/0231624 A1 * | 10/2005 | Muramatsu et al. ........... | 348/311 |
| 2006/0012698 A1 * | 1/2006 | Nitta et al. ..................... | 348/308 |
| 2006/0013485 A1 * | 1/2006 | Nitta et al. ..................... | 382/194 |
| 2006/0220939 A1 | 10/2006 | Kirsch | |
| 2007/0046513 A1 * | 3/2007 | Ham et al. ...................... | 341/118 |
| 2007/0046802 A1 | 3/2007 | Ham et al. | |
| 2007/0051893 A1 * | 3/2007 | Matsumoto .............. | 250/370.01 |
| 2009/0027518 A1 * | 1/2009 | Kita .......................... | 348/231.99 |
| 2011/0080512 A1 * | 4/2011 | Ay ................................. | 348/308 |

FOREIGN PATENT DOCUMENTS

| | | |
|---|---|---|
| JP | 06-153089 | 5/1994 |
| JP | 2000 078475 | 3/2000 |
| JP | 2000-261602 | 9/2000 |
| JP | 2001346106 | 12/2001 |
| JP | 2004 215048 | 7/2004 |

(Continued)

OTHER PUBLICATIONS

Japanese Patent Office Action corresponding to Japanese Serial No. 2008-256267 dated Jul. 20, 2010.

(Continued)

*Primary Examiner* — Lin Ye
*Assistant Examiner* — John H Morehead, III
(74) *Attorney, Agent, or Firm* — Sheridan Ross P.C.

(57) ABSTRACT

A solid-state imaging device includes: a pixel unit in which unit pixels outputting processing target signals are arranged in a horizontal direction and scanning lines are wired such that the processing target signals can be read out in order in a vertical direction within a repetition unit of an array of the unit pixels in the horizontal direction; an AD conversion unit including comparing units that compare a reference signal supplied from a reference-signal generating unit and the processing target signals, and counter units that perform count operation, the AD conversion unit performing AD conversion processing based on output data of the counter units; and a driving control unit that performs control to read out the processing target signals in order in the vertical direction and controls the reference-signal generating unit and the AD conversion unit such that AD conversion gains are individually adjusted in order to correct an output amplitude characteristic difference within the repetition unit during AD conversion processing.

19 Claims, 20 Drawing Sheets

FOREIGN PATENT DOCUMENTS

| | | |
|---|---|---|
| JP | 2007-060080 | 3/2007 |
| JP | 2007-060671 | 3/2007 |
| JP | 2007-281310 | 10/2007 |
| JP | 2008 136043 | 6/2008 |
| JP | 2008 141609 | 6/2008 |
| JP | 2008-172580 | 7/2008 |
| JP | 2008 199581 | 8/2008 |
| JP | 2008-0535397 | 8/2008 |
| JP | 2008-219243 | 9/2008 |
| JP | 2008 227800 | 9/2008 |
| JP | 2009303088 | 12/2009 |
| JP | 2010520709 | 6/2010 |
| WO | 2008/112104 | 9/2008 |

OTHER PUBLICATIONS

Sony Corporation; Japanese Application No. 2008-256267; Office action dated Mar. 1, 2011; 4 pages.

Japanese Office Action issued on Dec. 27, 2011 in connection with counterpart JP Application No. 2008-256267.

\* cited by examiner

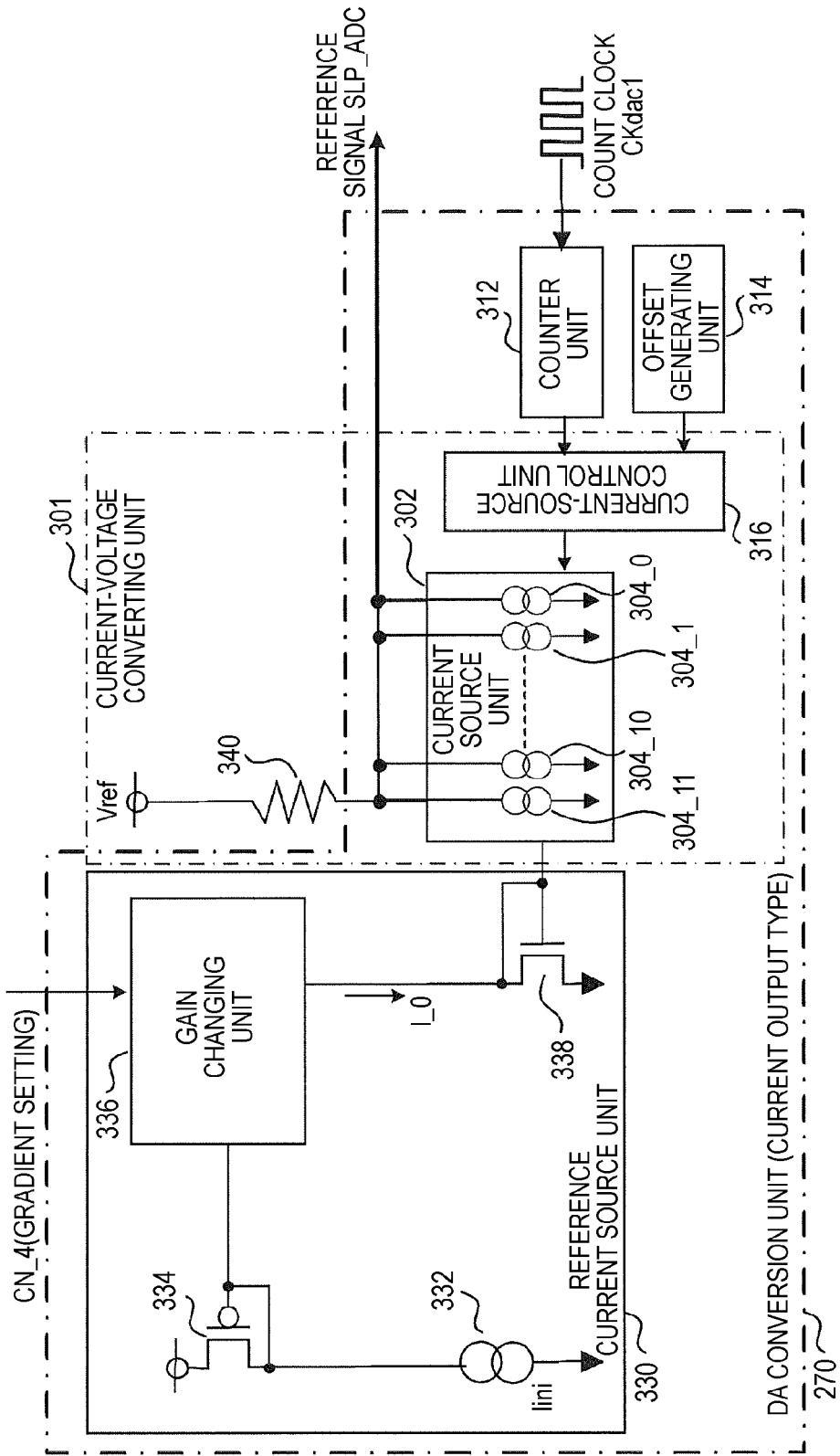

FIG.2B
(1) RELATION AMONG MAGNITUDE OF GRADIENT OF REFERENCE SIGNAL SLP_ADC, FREQUENCY OF COUNT CLOCK CKcnt1, AND BIT RESOLUTION
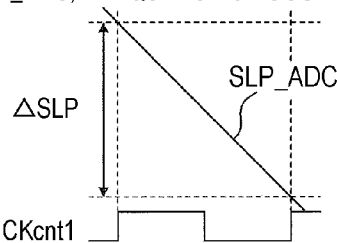
(2) MAGNITUDE OF GRADIENT OF REFERENCE SIGNAL SLP_ADC IS CHANGED/FREQUENCY OF COUNT CLOCK CKcnt1 IS FIXED
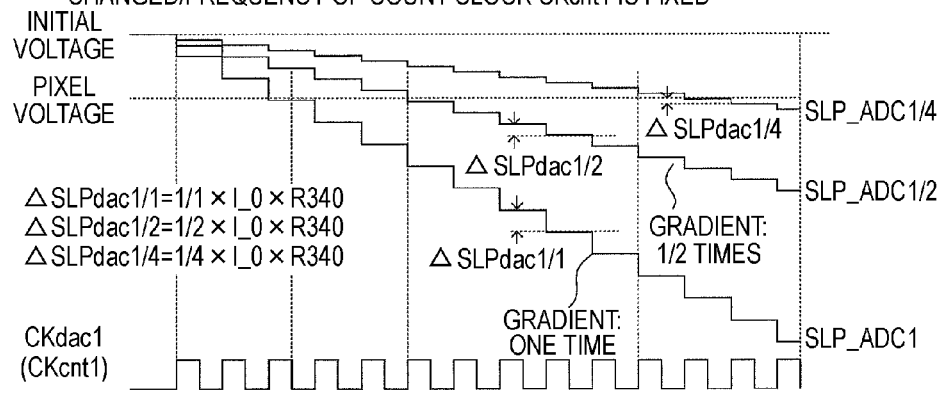
(3) MAGNITUDE OF GRADIENT OF REFERENCE SIGNAL SLP_ADC IS FIXED/ FREQUENCY OF COUNT CLOCK CKcnt1 IS CHANGED
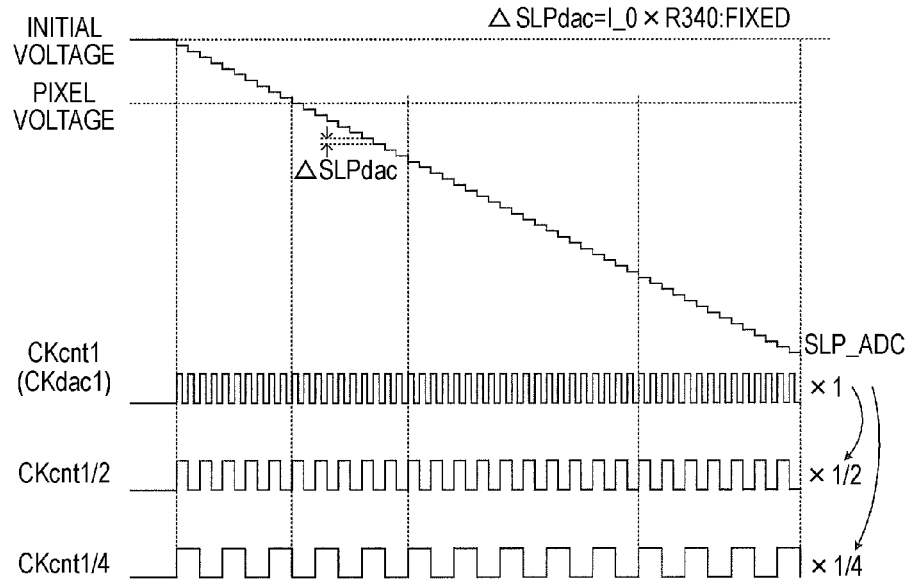

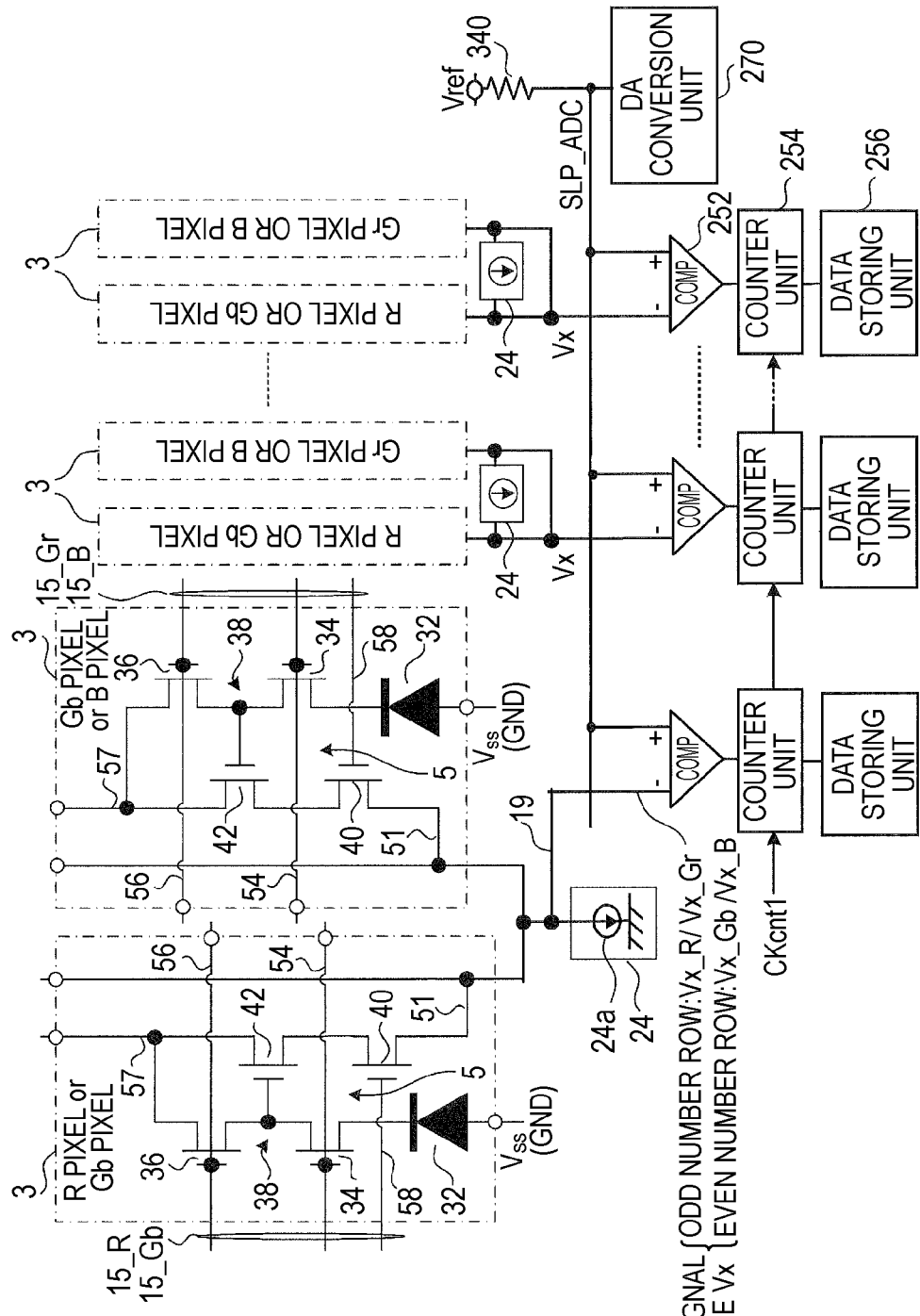

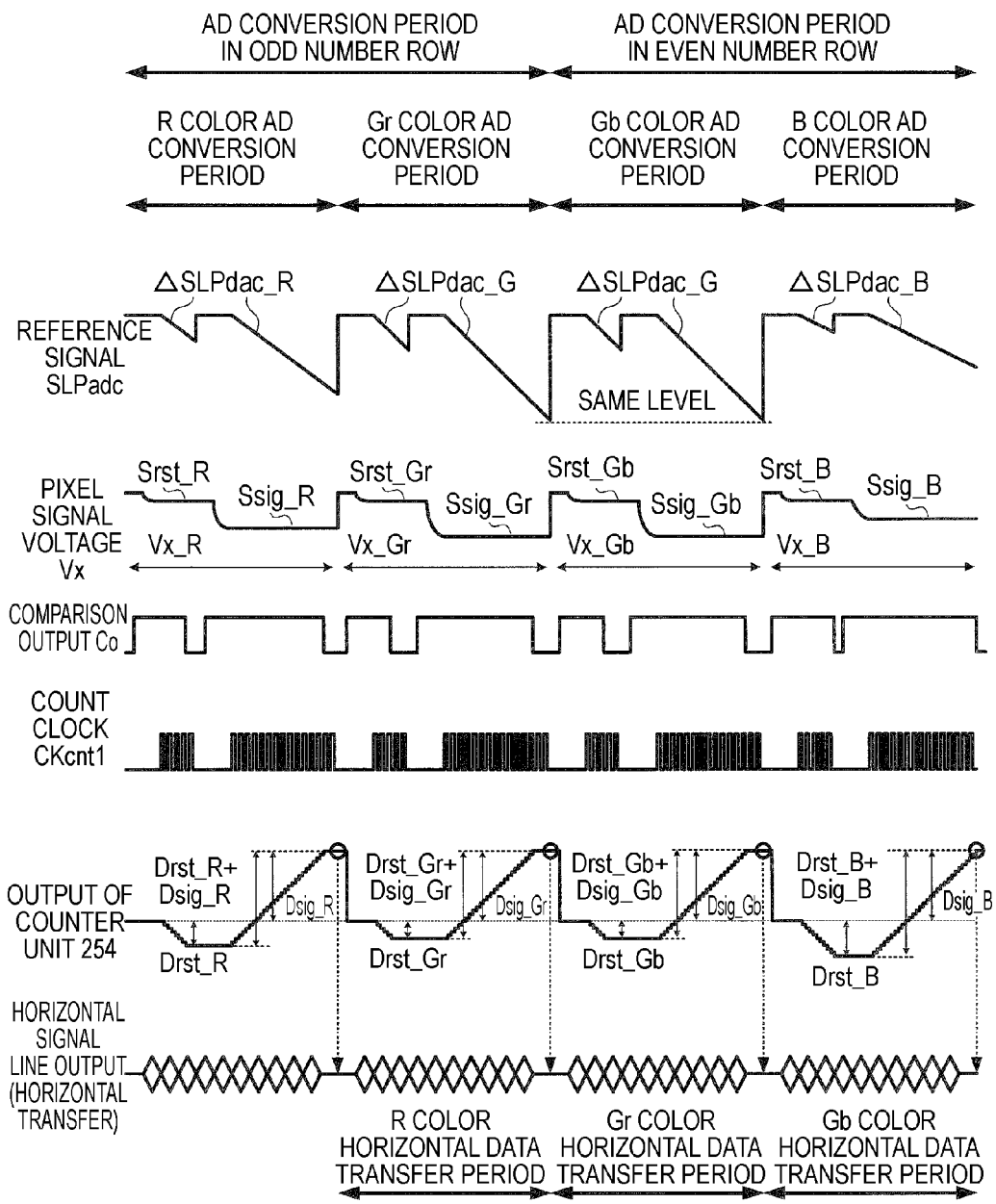

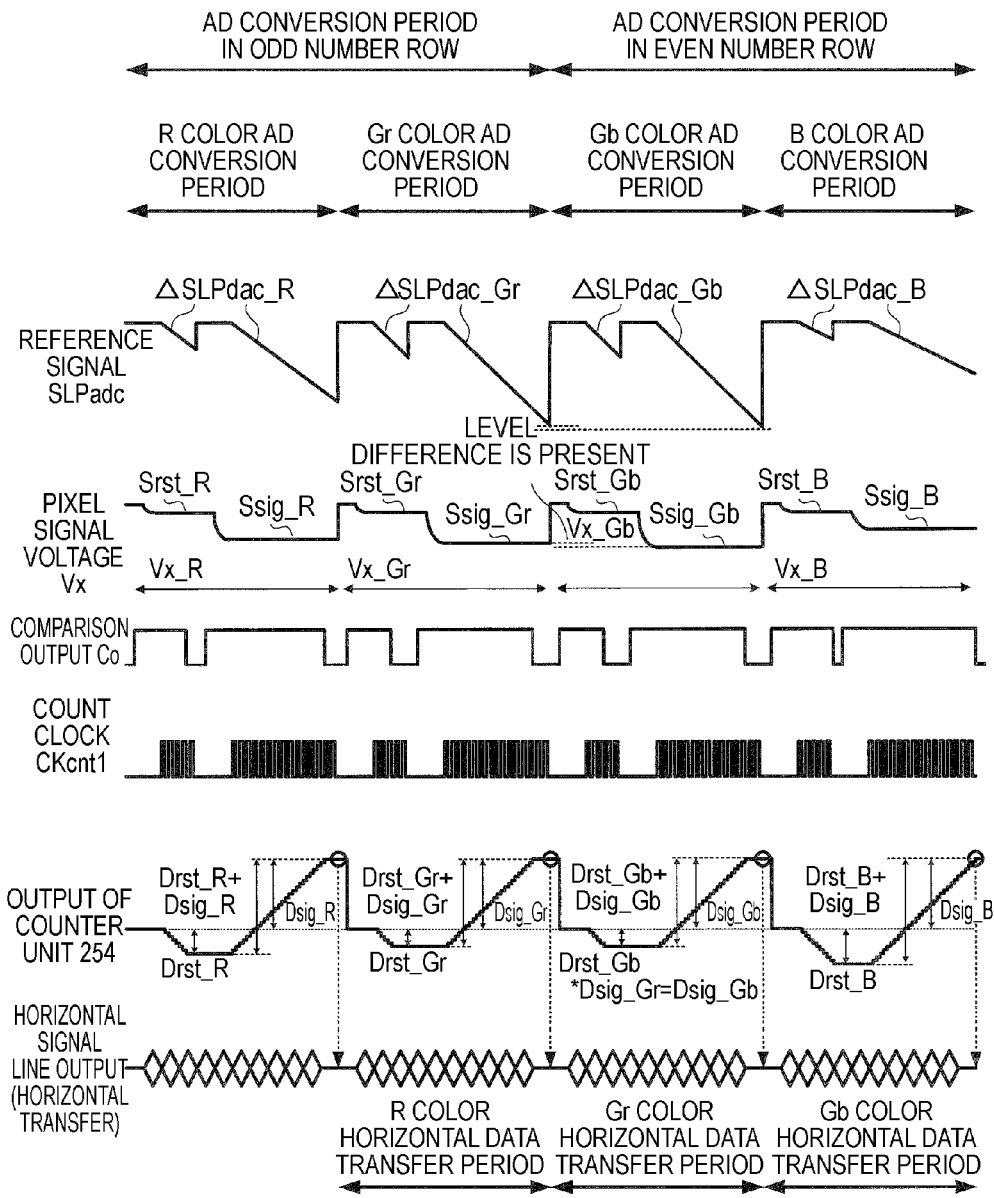

FIG.4C (1)

| R | G | R | W | | R | G | R | G |
|---|---|---|---|---|---|---|---|---|
| W | B | G | B | | W | B | W | B |
| R | G | R | G | --- | R | W | R | G |
| W | B | W | B | | G | B | W | B |

⋮ ⋮

| R | G | R | G | | R | G | R | G |
|---|---|---|---|---|---|---|---|---|
| W | B | W | B | | W | B | W | B |
| R | G | R | G | -- | R | G | R | G |
| W | B | W | B | | W | B | W | B |

R: RED
G: GREEN
B: BLUE
W: WHITE (2)

| Cy | Mg | Cy | Mg | | Cy | Mg | Cy | Mg |
|----|----|----|----|---|----|----|----|----|
| Mg | Ye | Mg | Ye | | Mg | Ye | Mg | Ye |
| Cy | Mg | Cy | Mg | --- | Cy | Mg | Cy | Mg |
| Mg | Ye | Mg | Ye | | Mg | Ye | Mg | Ye |

⋮ ⋮

| Cy | Mg | Cy | Mg | | Cy | Mg | Cy | Mg |
|----|----|----|----|---|----|----|----|----|
| Mg | Ye | Mg | Ye | | Mg | Ye | Mg | Ye |
| Cy | Mg | Cy | Mg | -- | Cy | Mg | Cy | Mg |
| Mg | Ye | Mg | Ye | | Mg | Ye | Mg | Ye |

Cy: CYAN
Mg: MAGENTA
Ye: YELLOW
 * Mg AT ONE OF
DIAGONAL ANGLES MAY
BE REPLACED WITH W (3)

| R | G | R | G | | R | G | R | G |
|---|---|---|---|---|---|---|---|---|
| E | B | E | B | | E | B | E | B |
| R | G | R | G | --- | R | G | R | G |
| E | B | E | B | | E | B | E | B |

⋮ ⋮

| R | G | R | G | | R | G | R | G |
|---|---|---|---|---|---|---|---|---|
| E | B | E | B | | E | B | E | B |
| R | G | R | G | -- | R | G | R | G |
| E | B | E | B | | E | B | E | B |

R: RED
G: GREEN
B: BLUE
E: EMERALD

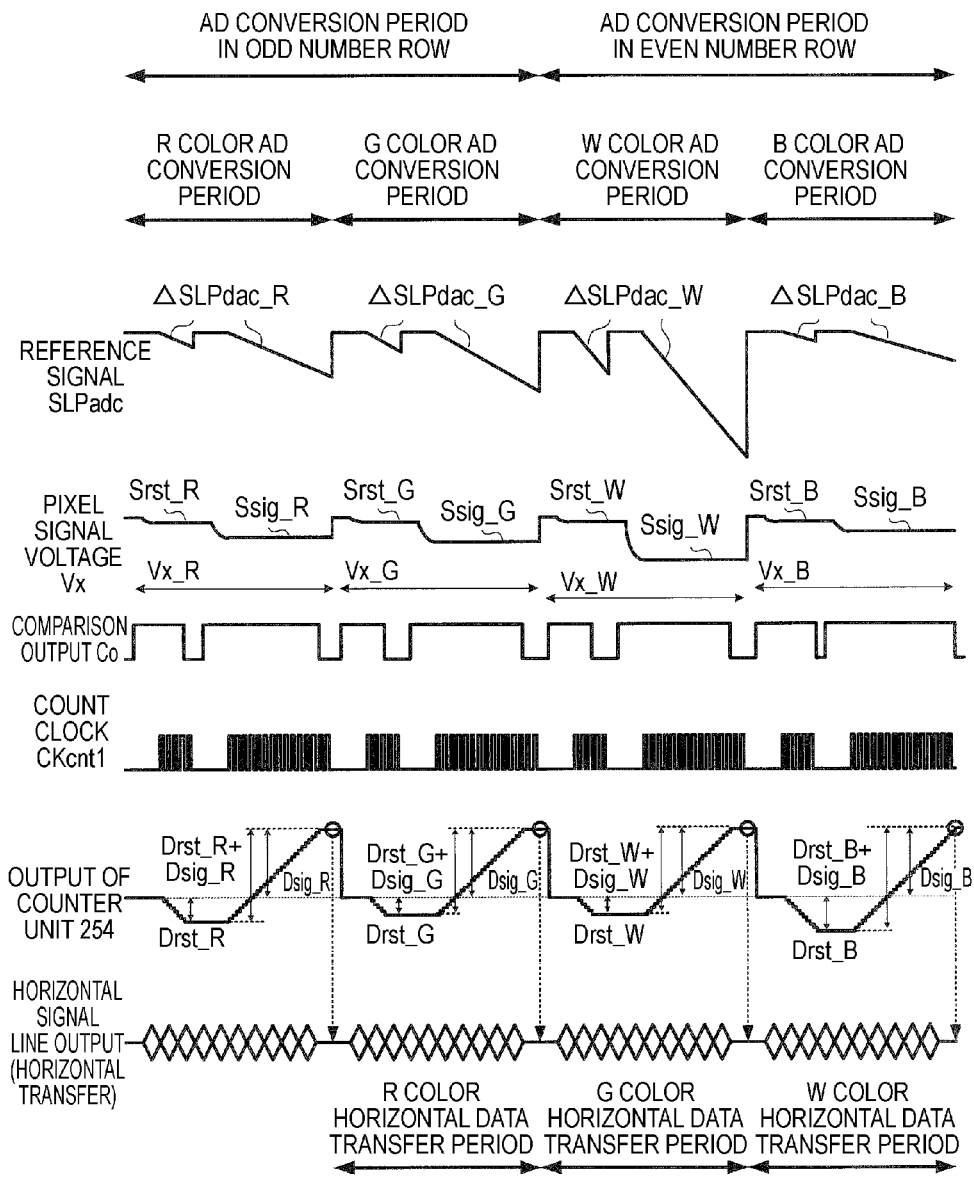

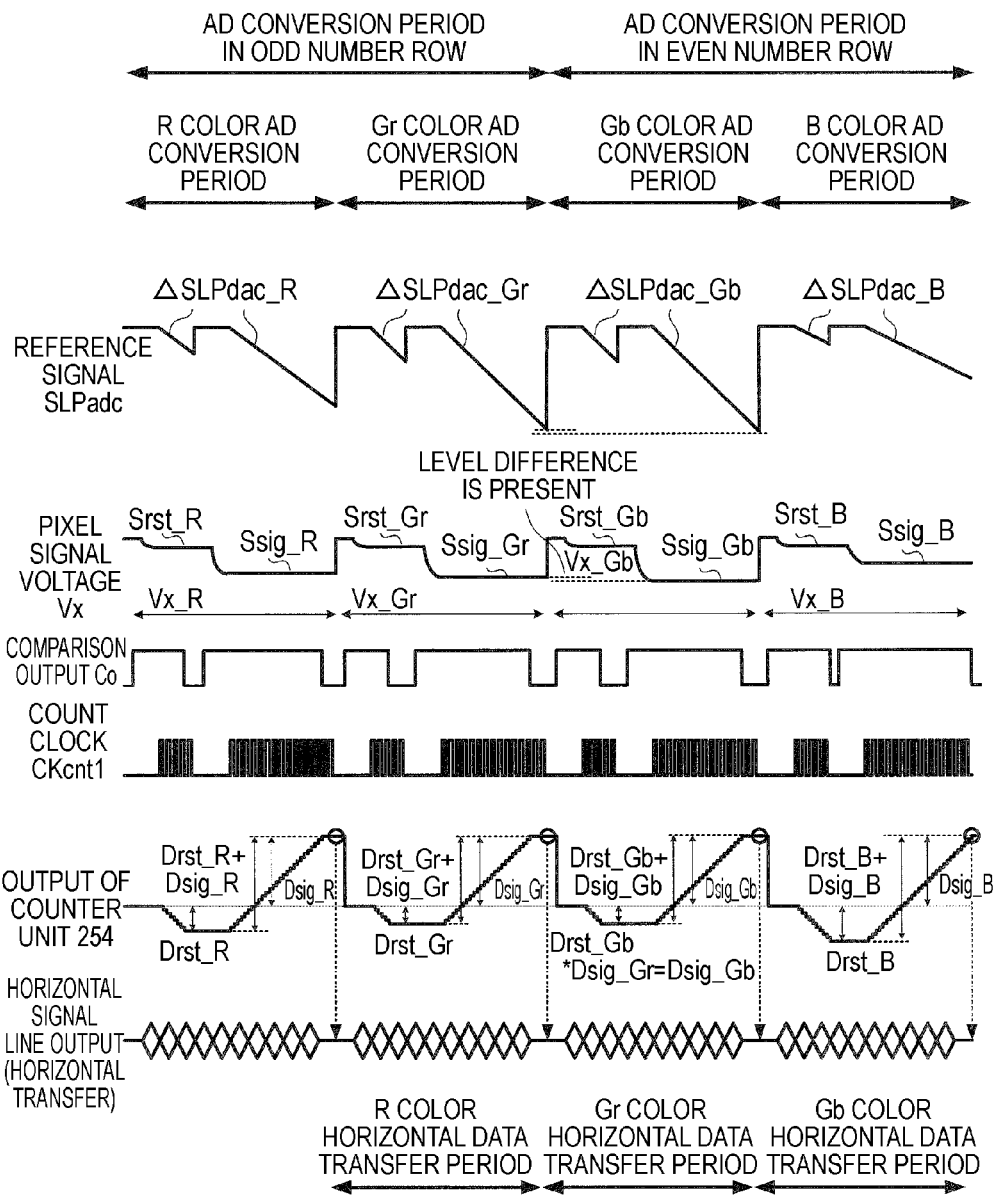

TO AD CONVERSION UNIT 250

FIG. 7D
(1) COMPARATIVE EXAMPLE
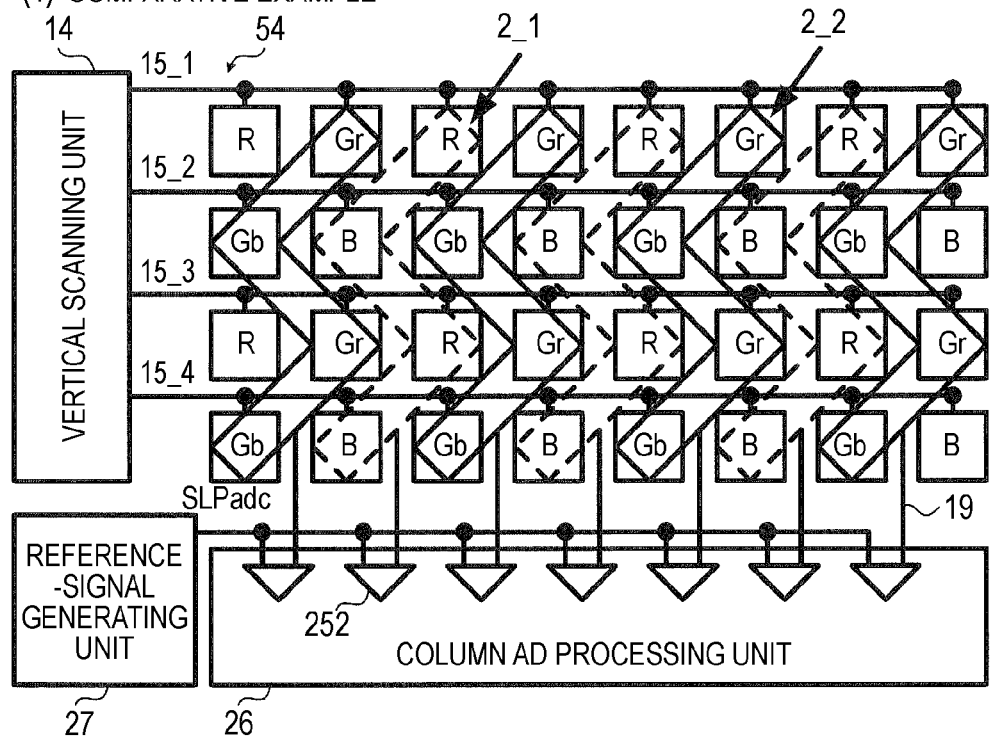
(2) FOURTH EMBODIMENT
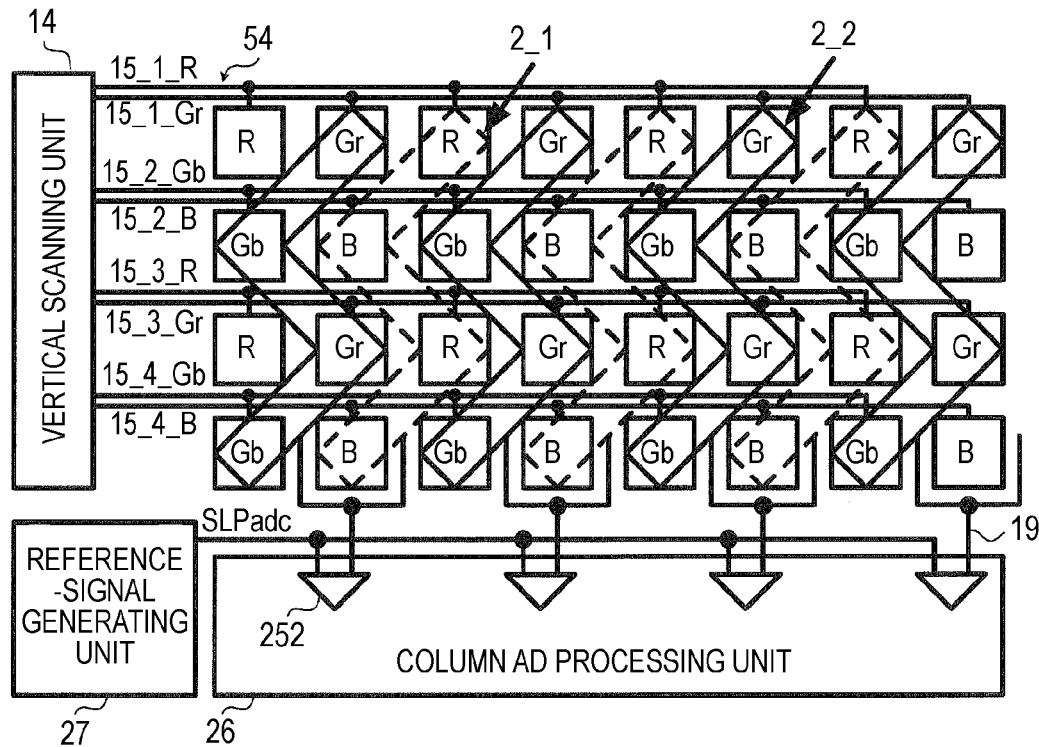

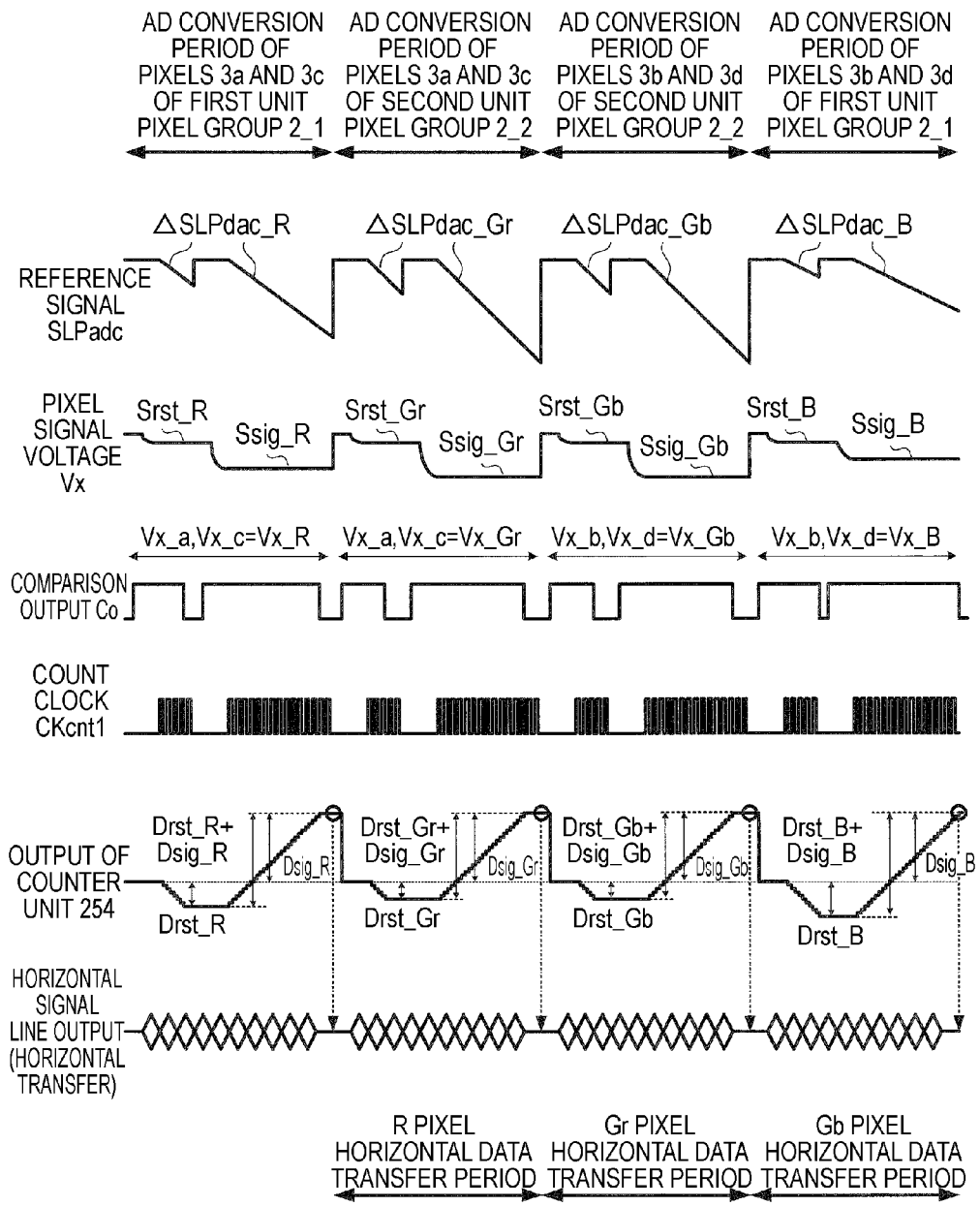

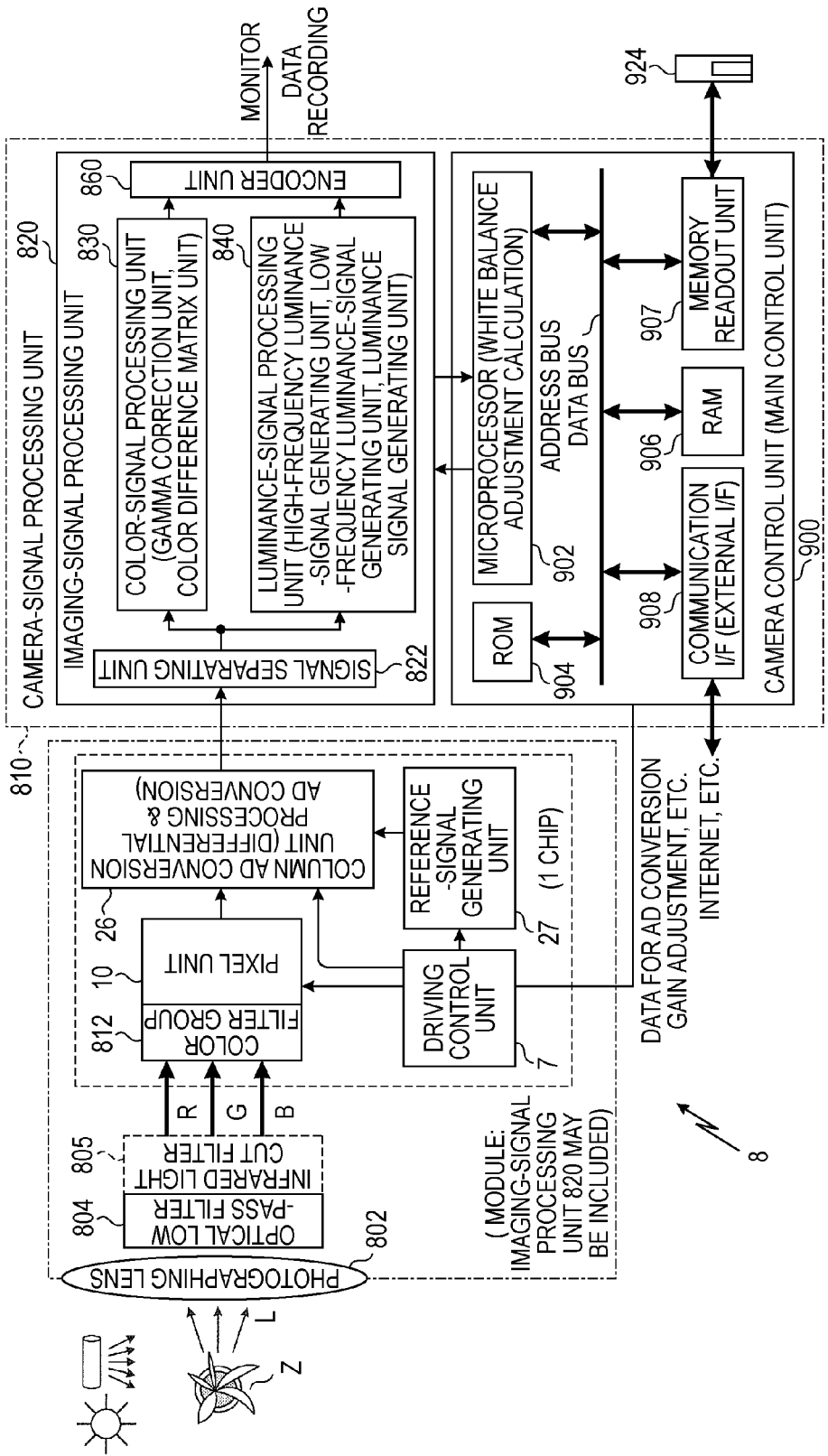

SOLID-STATE IMAGING DEVICE, IMAGING APPARATUS, AND AD CONVERSION GAIN ADJUSTING METHOD

BACKGROUND OF THE INVENTION

1. Field of the Invention

The present invention relates to a solid-state imaging device, an imaging apparatus, and an AD conversion gain adjusting method.

2. Description of the Related Art

For example, in the field of video apparatuses, CCD (Charge Coupled Device), MOS (Metal Oxide Semiconductor), or CMOS (Complementary Metal-Oxide Semiconductor) solid-state imaging devices that detect light (an example of an electromagnetic wave) among physical quantities are used. The solid-state imaging devices read out, as an electric signal, a physical quantity distribution converted into the electric signal by unit components (pixels in the solid-state imaging devices).

There is also an amplification solid-state imaging device including pixels of an amplification solid-state imaging element (APS: Active Pixel Sensor/also referred to as gain cell) configuration having a driving transistor for amplification in a pixel-signal generating unit that generates a pixel signal corresponding to a signal charge generated by a charge generating unit. For example, most of CMOS solid-state imaging devices have such a configuration.

For example, in an X-Y address type solid state imaging device in which unit pixels are arranged in a matrix shape, in order to impart an amplification function to pixels, the pixels are configured by using active elements (MOS transistors) of a MOS structure or the like. Specifically, signal charges (photoelectrons) accumulated in photodiodes serving as photoelectric conversion elements are amplified by the active elements and read out as image information. For example, a large number of pixel transistors are arrayed in a two-dimensional matrix shape to configure a pixel unit. Accumulation of signal charges corresponding to incident light is started for each of rows or each of pixels. Signals of electric currents or voltages based on the accumulated signal charges are read out in order from the pixels according to address designation.

In the MOS (including CMOS) solid-state imaging devices, as an example of address control, a column readout system (a column parallel output system) for simultaneously accessing all pixels for one row and reading out pixel signals from a pixel unit in row units is often used. An analog pixel signal for one row read out from the pixel unit may be converted into digital data by an analog to digital converter (an AD converter/ADC). Various mechanisms for AD conversion are proposed.

As an AD conversion system, various systems are devised from viewpoints of a circuit size, processing speed (an increase in speed), resolution, and the like. For example, there is an AD conversion system of a reference signal comparison type (see JP-A-2007-60671 and JP-A-2007-60080). The reference signal comparison type is also referred to as a slope integral type, a ramp signal comparison type, and the like.

In the AD conversion system of the reference signal comparison type, a reference signal (a ramp wave), a value of which gradually changes, is used for voltage comparison for converting analog data into digital data. An analog unit signal and the reference signal are compared. Digital data of a unit signal is acquired on the basis of a count value obtained by performing count processing in a count operation effective period based on a comparison processing result. In a system obtained by combining the AD conversion system of the reference signal comparison type and the column readout system (referred to as column AD system, an analog output from pixels can be subjected to AD conversion in a low band in a column-parallel manner. This is suitable for an image sensor that realizes both a high image quality and high speed.

SUMMARY OF THE INVENTION

However, in the mechanism disclosed in JP-A-2007-60671 and JP-A-2007-60080, an individual circuit configuration for generating and supplying a signal with a different gradient according to a color is necessary to cope with color adjustment during color image photographing. As a result, a circuit size increases, which causes a problem.

Therefore, it is desirable to provide a mechanism that can perform gain adjustment during AD conversion of a reference signal comparison type in order to correct an output amplitude characteristic difference among unit pixels while reducing a problem of an increase in circuit size.

According to an embodiment of the present invention, there is provided a mechanism of AD conversion gain adjustment in which a comparing unit compares a reference signal having a gradually-changing level and an analog processing target signal and a counter unit receives the supply of a count clock for AD conversion and performs count operation in a count operation effective period based on a result of the comparison. An AD conversion unit performs AD conversion processing of a reference signal comparison type.

In the mechanism, concerning a pixel unit, it is assumed that unit pixels that output analog processing target signals are arranged in the horizontal direction and scanning lines are wired such that processing target signals can be read out in order in the vertical direction within a repetition unit of an array of the unit pixels in the horizontal direction.

First, a driving control unit performs control to read out the processing target signals in order in the vertical direction within the repetition unit of the array of the unit pixels in the horizontal direction of the pixel unit. Further, the driving control unit individually adjusts the gradient of a reference signal supplied from a reference-signal generating unit and/or the frequency of a count clock for AD conversion in order to correct an output amplitude characteristic difference among the unit pixels within the repetition unit during AD conversion processing for the processing target signals. Specifically, the driving control unit individually adjusts a number of count clocks on a counter side with respect to a voltage change amount per unit time of a reference signal. In this way, the driving control unit individually adjusts AD conversion gains indicating the size of output data of a counter unit with respect to the processing target signals.

In such a mechanism, not only in the vertical direction but also in the horizontal direction (a row direction), the processing target signals are read out in order in the vertical direction for each repetition unit of the array of the unit pixels in the horizontal direction. According to the readout of the processing target signals, the gradient of the reference signal and the frequency of the count clock for AD conversion are individually adjusted, whereby the AD conversion gains are individually adjusted. Consequently, even if there is an output amplitude characteristic difference among the unit pixels, the characteristic difference is corrected.

Even when the gradient of the reference signal is individually adjusted within the repetition unit of the array of the unit pixels in the horizontal direction, only one circuit configuration for generating and supplying a reference signal has to be provided. Even when the frequency of the count clock is individually adjusted within the repetition unit of the array of the unit pixels in the horizontal direction, only one circuit configuration for generating and supplying a count clock has to be provided.

A device to which the mechanism for AD conversion gain adjustment is applied is applied to, for example, a solid-state imaging device. The solid-state imaging device may be formed as one chip or may be formed as a module having an imaging function in which an imaging unit and a signal processing unit or an optical system are collectively packages. The device can be applied not only to the solid-state imaging device but also to an imaging apparatus. Effects same as those in the solid-state imaging device can be obtained in the imaging apparatus. The imaging apparatus indicates, for example, a camera (or a camera system) and a portable apparatus having an imaging function. "Imaging" includes not only photographing of an image during normal camera photographing but also fingerprint detection in a broader sense.

According to the embodiment, it is possible to individually perform AD conversion gain adjustment of the reference signal comparison type in order to correct an output amplitude characteristic difference among unit pixels while reducing the problem of an increase in circuit size.

BRIEF DESCRIPTION OF THE DRAWINGS

FIG. 2A is a diagram of a configuration example of a DA conversion unit of a reference-signal generating unit used in the solid-state imaging device according to the first embodiment;

FIG. 2B shows diagrams for explaining AD conversion gains in AD conversion processing of a reference signal comparison type;

FIG. 3A is a simple circuit diagram of the solid-state imaging device according to the first embodiment with attention paid to AD conversion processing and CDS processing;

FIG. 4A is a timing chart for explaining AD conversion processing with attention paid to white balance adjusting operation of a first example in the solid-state imaging device according to the first embodiment;

FIG. 4B is a timing chart for explaining AD conversion processing with attention paid to white balance adjusting operation of a second example in the solid-state imaging device according to the first embodiment;

FIG. 4C shows diagrams for explaining color arrays of color separation filters applied in a third example of the first embodiment;

FIG. 4D is a timing chart for explaining AD conversion processing with attention paid to white balance adjusting operation of the third example in the solid-state imaging device of the first embodiment;

FIG. 5B is a timing chart for explaining AD conversion processing with attention paid to white balance adjusting operation in the solid-state imaging device according to the second embodiment;

FIG. 7D shows diagrams for explaining color imaging in the solid-stage imaging device having a pixel sharing structure shown in FIGS. 7A to 7C;

FIG. 7E is a timing chart for explaining AD conversion processing with attention paid to AD conversion gain adjusting operation in the solid-state imaging device according to the fourth embodiment; and FIG. 8 is a schematic diagram of an imaging apparatus according to a fifth embodiment of the present invention.

DESCRIPTION OF THE PREFERRED EMBODIMENTS

Embodiments of the present invention are explained in detail below with reference to the accompanying drawings. When functional elements are distinguished according to the embodiments, the functional elements are denoted by reference signs affixed with capital letters such as A, B, and C. When the functional elements are not distinguished according to the embodiments, the reference signs are omitted. The same applies to the drawings.

In an example explained below, a CMOS solid-state imaging device is used as a device. Unless specifically noted otherwise, in the CMOS solid-state imaging device, it is assumed that all unit pixels include nMOS transistors (n-channel MOS transistors) and signal charges are negative charges (electrons). However, this is only an example. The target device is not limited to the MOS solid-state imaging device. The unit pixels may include pMOS transistors (p-channel MOS transistors). The signal charges may be positive charges (holes).

Explanation is made in the following order:

1. A solid-state imaging device according to a first embodiment (a gain adjustment/AD conversion unit is provided for each color separation filter array in gradient adjustment for a reference signal)

2. A solid-state imaging device according to a second embodiment (a gain adjustment/AD conversion unit is provided for each unit pixel in gradient adjustment for a reference signal)

3. A solid-state imaging device according to a third embodiment (gain adjustment in clock frequency adjustment for AD conversion)

4. A solid-state imaging device according to a fourth embodiment (a gain adjustment/AD conversion unit is provided for each unit pixel group in gradient adjustment for a reference signal)

5. An imaging apparatus according to a fifth embodiment

1. Solid-State Imaging Device According to a First Embodiment

Figure 1:
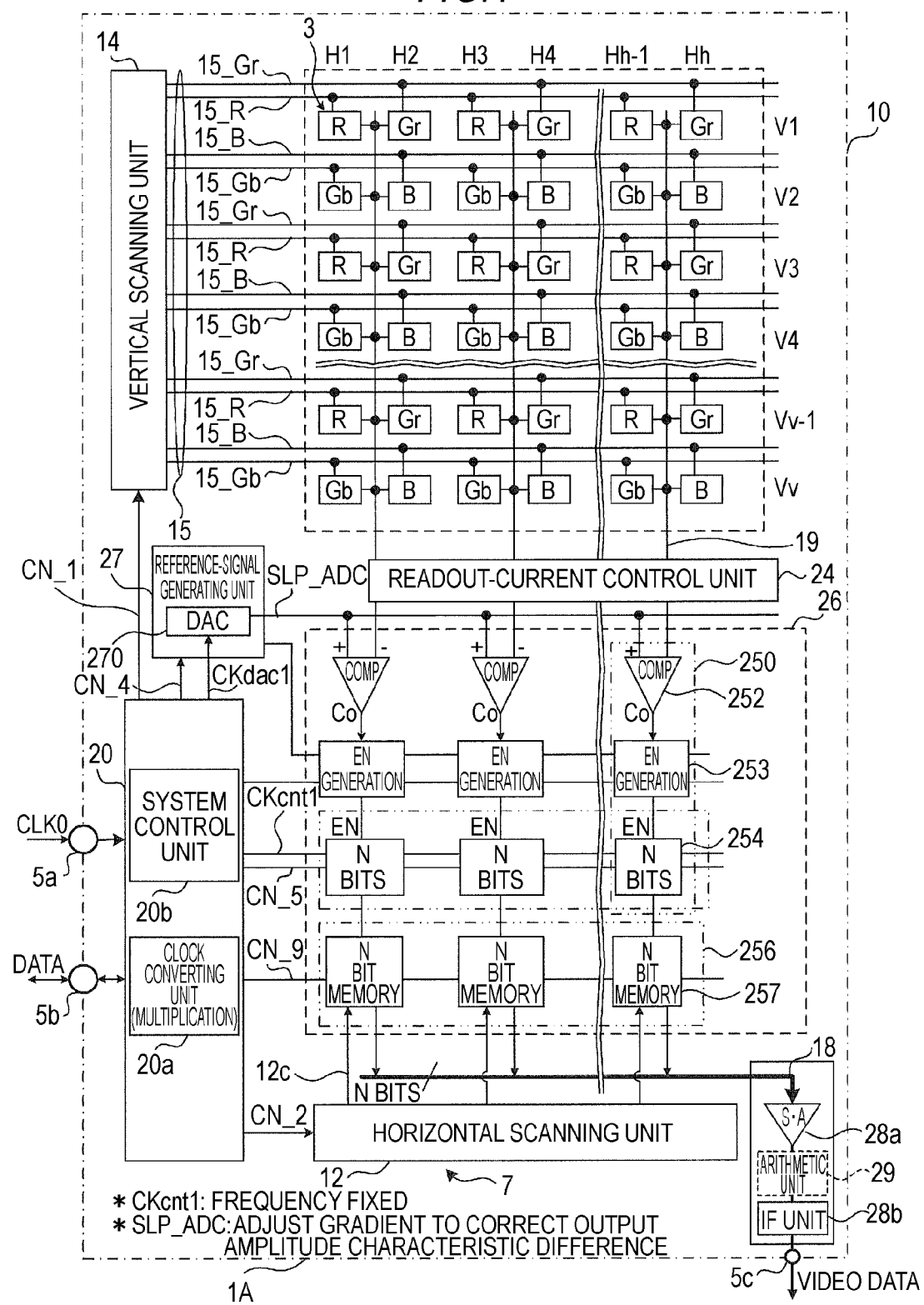
FIG. 1 is a schematic diagram of a CMOS solid-state imaging device according to a first embodiment of the present invention.

FIG. 1 is a schematic diagram of a CMOS solid-state imaging device (a CMOS image sensor) according to a first embodiment of the present invention.

A solid-state imaging device 1A according to the first embodiment includes a pixel unit 10 in which plural unit pixels 3 are arrayed in a two-dimensional matrix shape. The pixel unit 10 is applicable to color imaging. Specifically, on light receiving surfaces on which electromagnetic waves (in this example, light) are made incident of charge generating units in the pixel unit 10, any one of color separation filters including combinations of color filters of plural colors for picking up color images is provided.

In the example shown in the figure, basic color filters of a Bayer array are used. A repetition unit of the color separation filters is arranged in 2×2 pixels to form the pixel unit 10 such that the unit pixels 3 arranged in a square lattice shape correspond to color filters for three colors R (red), G (green, and B (blue). In a row direction, G adjacent to R is represented as Gr and G adjacent to B is represented as Gb.

First color pixels for sensing a first color (red; R) are arranged in odd number rows×odd number columns. Second color pixels for sensing a second color (green; Gr) are arranged in odd number rows×even number columns. Third color pixels for sensing a third color (green; Gb) are arranged in even number rows×odd number columns. Fourth color pixels for sensing a fourth color (blue; B) are arranged in even number rows×even number columns. The second color (green; Gr) and the third color (Green; Gb) are the same color G. Consequently, in the solid-state imaging device 1A according to the first embodiment, since a color pixel for different two colors R and Gr or Gb and B is arranged for each of rows in a checker pattern, the pixel unit 10 is made applicable to color imaging. Such a color array of the basic color filters of the Bayer array is repeated for every two colors R and Gr or Gb and B in both the row direction and the column direction.

In FIG. 1, a part of rows and columns is omitted for simplification of illustration. However, actually, several tens to several thousands unit pixels 3 are arranged in the rows and the columns. As explained later, besides a photodiode as a light receiving element (a charge generating unit, which is an example of a detecting unit, each of the unit pixels 3 includes, for example, an intra-pixel amplifier having three or four transistors for charge transfer, reset, amplification, and the like. A pixel signal voltage Vx is output from the unit pixel 3.

In the pixel signal voltage Vx of vertical signal lines 19, in time series, a signal level Ssig appears after a reset level Srst (representing a reset component Vrst) including noise of a pixel signal serving as a reference level. The signal level Ssig is a level obtained by adding a signal component Vsig to the reset level Srst. The signal component Vsig is obtained according to Ssig(=Srst+Vsig)−Srst.

The solid-stage imaging device 1A further includes a column AD processing unit 26 in which AD conversion units 250 that perform a CDS (Correlated Double Sampling) processing function and a digital conversion function are provided in a column parallel manner. In an AD conversion processing process in the column AD processing unit 26, differential processing for AD conversion results of a reset level and a signal level is simultaneously performed, whereby CDS processing in a digital domain is performed.

The solid-state imaging device 1A further includes a driving control unit 7, a readout-current source unit 24 that supplies an operating current (a readout current) for pixel signal readout to the unit pixels 3, a reference-signal generating unit 27 that supplies a reference signal SLPadc for AD conversion to the column AD processing unit 26, and an output unit 28. In the figure, the reference-signal generating unit 27 is provided in the solid-state imaging device 1. However, the reference-signal generating unit 27 may be provided on the outside of the solid-state imaging device 1.

The driving control unit 7 includes a horizontal scanning unit 12 (a column scanning circuit) and a vertical scanning unit 14 (a row scanning circuit) for realizing a control circuit function for sequentially reading out signals of the pixel unit 10 and a communication/timing control unit 20. The horizontal scanning unit 12 designates a column position of data that should be read out during data transfer operation.

Although not shown in the figure, the horizontal scanning unit 12 includes a horizontal-address setting unit and a horizontal driving unit that control a column address and column scanning. Although not shown in the figure, the vertical scanning unit 14 includes a vertical-address setting unit and a vertical driving unit that control a row address and row scanning. The horizontal scanning unit 12 and the vertical scanning unit 14 start selection operation (scanning) for a row and a column in response to control signals CN_1 and CN_2 given from the communication/timing control unit 20.

The unit pixels 3 are connected to the vertical scanning unit 14 via row control lines 15 for row selection and connected to the AD conversion units 250 provided for the respective vertical signal lines 19 of the column AD processing unit 26 via the vertical signal lines 19. The row control lines 15 indicate wire lines that enter the unit pixels 3 from the vertical scanning unit 14.

The vertical scanning unit 14 selects a row of the pixel unit 10 and supplies a necessary pulse to the row. The vertical-address setting unit of the vertical scanning unit 14 selects a row for an electric shutter and the like besides a row from which a signal is read out (a readout row: also referred to as selection row and signal output row).

The communication/timing control unit 20 includes a functional unit of a timing generator (an example of a readout-address control device) that supplies a clock, which synchronizes with a master clock CLK0 input via a terminal 5a, to the units (the scanning units 12 and 14 and the column AD processing unit 26) in the device. Further, the communication/timing control unit 20 includes a functional unit of a communication interface. The functional unit of the communication interface receives the master clock CLK0 from an external main control unit via the terminal 5a, receives data for commanding an operation mode and the like from the external main control unit via a terminal 5b, and outputs data including information concerning the solid-state imaging device 1A to the external main control unit.

For example, the communication/timing control unit 20 includes a clock converting unit 20a having a function of a clock converting unit that generates an internal clock using a PLL (a phase locked loop) circuit and the like and a system control unit 20b having a communication function and a function for controlling the units. The clock converting unit 20a incorporates a multiplying circuit that generates, on the basis of the master clock CLK0 input via the terminal 5a, a pulse having a faster frequency than that of the master clock CLK0. The clock converting unit 20a generates internal clocks such as a count clock CKcnt1 and a count clock CKdac1.

The output unit 28 includes a sense amplifier 28a (S·A) that detects a signal (which is digital data but has small amplitude) on a horizontal signal line 18, which is a signal line for data transfer (a transfer wire line), and an interface unit 28b (an IF unit) that performs an interface function between the solid-state imaging device 1A and the outside. An output of the interface unit 28b is connected to an output terminal 5c. Video data is output to a post-stage circuit. In the output unit 28, a digital arithmetic unit 29 that performs various kinds of digital operation processing may be provided between the sense amplifier 28a and the interface unit 28b.

The first embodiment adopts, for gain adjustment by color, a system for reading out, concerning the row direction, each of pixel signal voltages Vx having color information of the same color in order and converting the pixel signal voltage Vx into digital data according to a column AD system rather than simultaneously reading out the pixel signal voltages Vx as in the column AD system in the past. For this system, first, the pixel unit 10 includes the row control lines 15 for each of the unit pixels 3 of the same color.

Concerning a connection relation between the pixel unit 10 and the column AD processing unit 26, in the first embodiment, the pixel signal voltage Vx is supplied to the column AD processing unit 26 via one vertical signal line 19 for each repetition unit in the row direction of the color separation filters. "For each repetition unit in the row direction of the color separation filters" is hereinafter referred to as "for each color separation filter array".

For example, when color separation filters in which color filters for R, Gr, Gb, and B are arranged in the Bayer array are used, in odd number rows, row control lines for R 15_R connected in common to all the unit pixels 3 for R in the rows and row control lines for Gr 15_Gr connected in common to all the unit pixels 3 for Gr in the rows are provided. In even number rows, row control lines for Gb 15_Gb connected in common to all the unit pixels 3 for Gb in the rows and row control lines for B 15_B connected in common to all the unit pixels 3 for B in the rows are provided.

For the unit pixels 3 for two columns (two vertical columns), i.e., for each color separation filter array, the pixel signal voltage Vx is supplied to the AD conversion units 250 of the column AD processing unit 26 via the vertical signal lines 19. In comparison with a second embodiment explained later, there is an advantage that the number of the AD conversion units 250 can be halved. On the other hand, it is necessary to read out the pixel signal voltages Vx for R and Gr (in the case of odd number rows) and Gb and B (in the case of even number rows) in order in rows. Therefore, when a frame rate is the same as that in the configuration in the past to which the first embodiment is not applied, it is necessary to perform vertical scan driving at speed twice as high as the normal speed (double speed driving).

Details of the Column AD Circuit and the Reference-Signal Generating Unit

As an AD conversion system, various systems are conceivable from viewpoints of a circuit size, processing speed (an increase in speed), resolution, and the like. In this embodiment, an AD conversion system of a reference signal comparison type is adopted. This method has a characteristic that, since AD converters can be realized with a simple configuration, a circuit size is not increased even if the AD converters are provided in parallel. In AD conversion of the reference signal comparison type, a count operation effective period Ten is determined on the basis of time from conversion start (the start of comparison processing) to conversion end (the end of the comparison processing). A processing target signal is converted into digital data on the basis of the number of clocks in that period. A signal indicating the count operation effective period Ten is represented as count enable signal EN.

When the AD conversion system of the reference signal comparison type is adopted, as an idea, it is also conceivable to provide the reference-signal generating unit 27 in a column parallel manner (in this embodiment, for each color separation filter array). For example, a comparator and a reference signal generator are provided in each of the pixel columns and, on the basis of a comparison result of the comparator in the column, a value of a reference signal is sequentially changed by the reference signal generator in the column corresponding to the comparator. However, with such a configuration, a circuit size and power consumption increase. Therefore, in this embodiment, the reference-signal generating unit 27 is used in common in all the columns. The AD conversion units 250 for each color separation filter array share the reference signal SLPadc generated from the reference-signal generating unit 27.

Therefore, the reference-signal generating unit 27 includes a DA conversion unit 270 (DAC; Digital Analog Converter). The DA conversion unit 270 generates, from an initial value indicated by control data CN_4 from the communication/timing control unit 20, the reference signal SLPadc having a gradient (a rate of change) indicated by the control data CN_4 in synchronization with the count clock CKdac1. The count clock CKdac1 may be the same as the count clock CKcnt1 for a counter unit 254. The reference signal SLPadc only has to be a signal having a waveform linearly changing with a certain gradient as a whole. The change may be a smooth slope-like change or may be a step-like sequential change.

In the AD conversion of the reference signal comparison type, the count operation effective period Ten is determined on the basis of a result of comparison of the reference signal SLPadc and the pixel signal voltage Vx by a comparing unit 252. An analog processing target signal (the pixel signal voltage Vx) is converted into digital data on the basis of the number of clocks of the count clock CKcnt1 in a period in which the count enable signal EN is active.

Processing concerning the reset level Srst is referred to as processing in a pre-charge phase (which may be abbreviated as P phase). Processing concerning the signal level Ssig is referred to as processing in a data phase (which may be abbreviated as D phase). When the processing in the D phase is performed after the processing in the P phase, the processing in the D phase is processing concerning the signal level Ssig obtained by adding the signal component Vsig to the reset level Srst.

As a method of determining the count operation effective period Ten, since differential processing between a P phase level and a D phase level performed in the AD conversion units 250 is related, various methods are conceivable. For example, in general, a first processing example can be adopted in which, during processing in both the phases, count start is set at a change start point of the reference signal SLPadc and count end is set at a point when the reference signal SLPadc and a processing target signal voltage coincide with each other (in fact, a point when the reference signal SLPadc and the processing target signal voltage cross each other). This is a system for performing count in a former half with respect to a changing point of a comparison output Co (referred to as former-half count system) during the AD conversion processing in both the P phase and the D phase.

In count processing in the P phase and the D phase for acquiring the digital data Dsig of the signal component Vsig of one pixel, when the counter is actuated by switching down-count operation and up-count operation, this is effective because the CDS processing can be simultaneously realized. When digital data of the signal level Ssig obtained in the P-phase processing is represented as Drst and digital data of the signal component Vsig is represented as Dsig, digital data obtained in the D-phase processing is Drst+Dsig. When count modes are set different in the P phase and the D phase, an operation result of Drst+Dsig−Drst=Dsig (or a negative value thereof) is automatically acquired after the D-phase processing.

As a modification of the first processing example, a system for performing count in a latter half with respect to the changing point of the comparison output Co (hereinafter referred to as latter-half count system) during the AD conversion processing in both the P phase and the D phase may be adopted. A system for realizing the differential processing in the P phase and the D phase by setting count modes different while keeping the count operation effective period Ten the same (the latter-half count system) can be adopted.

In the processing in the phases, a second processing example for varying a method of determining the count operation effective period Ten can also be adopted. In the processing in one of the phases, count start is set at a change start point of the reference signal SLPadc and count end is set at a point when the reference signal SLPadc and the processing target signal voltage coincide with each other. In the processing in the other phase, count start is set at a point when the reference signal SLPadc and the processing target signal voltage coincide with each other and count end is set at a point when the number of counts reaches a specified number of counts in the counting (typically, a point when the counting reaches a maximum AD conversion period). This is a method of performing counting in a former half with respect to the changing point of the comparison output Co during the AD conversion processing in one of the P phase and the D phase and performing counting in a latter half with respect to the changing point of the comparison output Co during the AD conversion processing in the other of the P phase and the D phase (referred to as former and latter half count system).

The idea of the latter half count makes use of a characteristic that, when digital data in a full range is represented as Dm and digital data of the pixel signal voltage Vx is represented as Dx, data obtained in the latter half count is Dm−Dx (i.e., a complement for Dx). The former and latter half count system makes use of this characteristic and a characteristic (a real number) of data obtained in the former half count. In this case, the counter only has to operate in one of the down-count operation and the up-count operation in the count processing in the P phase and the D phase. In this case, the CDS processing can also be simultaneously realized.

Specifically, when an initial value during the P-phase processing is represented as Dini, digital data obtained in the P-phase processing is Dini±Drst. Digital data obtained in the D-phase processing after that is {(Dini±Drst)±(Dm−(Dsig+Drst))}. "±" depends on a count mode and is "+" during an up mode and is "−" during a down mode. During the up mode, −Dsig is automatically acquired after the D-phase processing by setting Dini to −Dm. During the down mode, Dsig is automatically acquired after the D-phase processing by setting Dini to Dm.

As an idea, it is also conceivable to adopt a third processing example for independently storing a P-phase processing result and a D-phase processing result and performing, at a post stage of the AD conversion units 250 (e.g., the digital arithmetic unit 29), differential processing between the P-phase level and the D-phase level. This means that P-phase data and D-phase data are separately transferred to the output unit 28 side and the CDS processing is performed by the digital arithmetic unit 29. When a combination with a gradient direction (positive or negative) of the reference signal SLPadc is also taken into account, more various forms can be adopted.

In all the processing examples, in principle, the reference signal SLPadc is supplied to the comparator (a voltage comparator) and an analog pixel signal input via the vertical signal line 19 is compared with the reference signal SLPadc. Thereafter, in the count operation effective period Ten, counting with a clock signal is started. AD conversion is performed by counting the number of clocks in the designated count operation effective period Ten.

In order to perform the AD conversion of the reference signal comparison type, the AD conversion unit 250 according to this embodiment includes a comparing unit 252 (COMP), a count-operation control unit 253 (EN generation, and a counter unit 254. The count clock CKcnt1 is input to a clock terminal CK of the counter unit 254 from the communication/timing control unit 20 in common to clock terminals CK of other counter units 254. Preferably, the counter unit 254 can switch the up-count mode and the down-count mode. In this example, the AD conversion unit 250 further includes, at a post stage of the counter unit 254, a data storing unit 256 incorporating a latch 257 (memory) for horizontal transfer.

The comparing unit 252 compares the reference signal SLPadc generated by the reference-signal generating unit 27 and the analog pixel signal voltage Vx obtained from the unit pixels 3 in a selected row through the vertical signal lines 19 (H1, H2, . . . , and Hh). The comparing unit 252 reverses the comparison output Co (comparator output) when the reference signal SLPadc and the pixel signal voltage Vx coincide with each other.

The count-operation control unit 253 controls an operation period of the counter unit 254 of the AD conversion unit 250 to acquire data for N bits concerning the pixel signal voltage Vx as a processing target signal. The count-operation control unit 253 supplies the count enable signal EN to the counter unit 254 and controls a count operation period of the counter unit 254.

The count-operation control unit 253 generates, referring to the comparison output Co from the comparing unit 252, the count enable signal EN for specifying the next count operation effective period Ten having a fixed relation with the comparison output Co of the comparing unit 252. To realize the operation of the count-operation control unit 253, control information is supplied from the reference-signal generating unit 27 to the count-operation control unit 253. As "control information", control information matching the configuration of the DA conversion unit 270 and a specific configuration of the count-operation control unit 253 corresponding thereto is used. The counter unit 254 counts, with the count clock CKcnt1, an active period of the count enable signal EN from the count-operation control unit 253 and holds a count result.

In such a configuration, the AD conversion unit 250 performs count operation in a pixel signal readout period and outputs a count result. Specifically, first, the comparing unit 252 compares the voltage of the reference signal SLPadc from the reference-signal generating unit 27 and the pixel signal voltage Vx input via the vertical signal line 19. When both the voltages are the same, the comparison output Co of the comparing unit 252 is reversed. For example, the comparing unit 252 sets an H level of a power supply potential or the like as an inactive state and transitions the power supply potential or the like to an L level (an active state) when the pixel signal voltage Vx and the reference signal SLPadc coincide with each other.

A control signal CN_5 for instructing a count mode (up or down) in the phases of the counter units 254, setting and reset processing of the initial value Dini in the count processing in the P phase, and the like are input from the communication/timing control unit 20 to the counter units 254 of the AD conversion units 250.

The reference signal SLPadc generated by the reference-signal generating unit 27 is input to an input end (+) of the comparing unit 252 in common to input ends (+) of the other comparing unit 252. The vertical signal lines 19 of the vertical columns corresponding to input ends (−) of the comparing units 252 are connected to the input ends (−). The pixel signal voltage Vx is input to each of the input ends (−) from the pixel unit 10.

When the data storing units 256 are not provided, a control pulse (a horizontal scanning pulse) is input to the counter units 254 from the horizontal scanning unit 12 via control lines 12c (column scanning lines). The counter units 254 have a latch function for holding count results and hold counter output values until an instruction by a control pulse is received via the control lines 12c. Both a system for setting data notified to the output unit 28 side to a count value immediately before step change for the reference signal SLPadc and a system for setting the data to a count value immediately after the step change for the reference signal SLPadc can be adopted. The data has a difference equivalent to 1 LSB depending on which of the systems is adopted. However, the data is only output by being shifted by 1 LSB as a whole. This may be considered to belong to a category of a quantization error. When the fact that the data is decided after the comparison output Co is reversed is taken into account, a circuit configuration is considered to be more compact in the latter system.

The elements of the driving control unit 7 such as the horizontal scanning unit 12 and the vertical scanning unit 14 are integrally formed in a semiconductor region such as monocrystal silicon together with the pixel unit 10 by using a technique same as a semiconductor integrated circuit manufacturing technique. The solid-state imaging device 1A according to this embodiment is configured as a so-called one-chip product (provided on the same semiconductor substrate).

The solid-state imaging device 1A may be formed as one chip in which the units are integrally formed in the semiconductor region in this way. Although not shown in the figure, the solid-state imaging device 1A may take a module-like form having an imaging function obtained by collectively packaging, besides the signal processing units such as the pixel unit 10, the driving control unit 7, and the column AD processing unit 26, optical systems such as a photographing lens and an optical low-pass filter.

On output sides of the respective AD conversion units 250, outputs of the counter units 254 can be connected to the horizontal signal line 18. As shown in the figure, it is also possible to adopt a configuration including, at a post stage of the counter units 254, the data storing units 256 as memory devices including latches 257 that hold count results held by the counter units 254. The data storing units 256 hold and store count data output from the counter units 254 at timing instructed by a control signal CN_9 from the communication/timing control unit 20.

The horizontal scanning unit 12 has a function of a readout scanning unit for reading out count values held by the data storing units 256 in parallel to processing performed by the comparing units 252 and the counter units 254 of the column AD processing unit 26. Outputs of the data storing units 256 are connected to the horizontal signal line 18.

The horizontal signal line 18 is connected to the output unit 28 that has signal lines equivalent to bit width of the AD conversion units 250 or width twice as large as the bit width (e.g., in the case of complementary output) and has the sense amplifier 28a corresponding to output lines. A horizontal transfer channel of the horizontal signal line 18 is not limited to one. Plural channels may be set for the horizontal signal line 18 to perform data transfer by grouping the channels for every plural columns. The counter units 254, the data storing units 256, and the horizontal signal line 18 respectively adopt configurations corresponding to N bits.

When the data storing units 256 are not provided, control pulse (a horizontal scanning pulse) is input to the counter units 254 from the horizontal scanning unit 12 via the control lines 12c (the column scanning lines). The counter units 254 have a latch function for holding count results and hold counter output values until an instruction by a control pulse is received via the control lines 12c. Both a system for setting data notified to the output unit 28 side to a count value immediately before step change for the reference signal SLPadc and a system for setting the data to a count value immediately after the step change for the reference signal SLPadc can be adopted. The data has a difference equivalent to 1 LSB depending on which of the systems is adopted. However, the data is only output by being shifted by 1 LSB as a whole. This may be considered to belong to a category of a quantization error. When the fact that the data is decided after the comparison output Co is reversed is taken into account, a circuit configuration is considered to be more compact in the latter system.

The elements of the driving control unit 7 such as the horizontal scanning unit 12 and the vertical scanning unit 14 are integrally formed in a semiconductor region such as monocrystal silicon together with the pixel unit 10 by using a technique same as a semiconductor integrated circuit manufacturing technique. The solid-state imaging device 1A according to this embodiment is configured as a so-called one-chip product (provided on the same semiconductor substrate).

Reference-Signal Generating Unit: a Basic Configuration

FIG. 2A is a diagram of a configuration example of the DA conversion unit 270 of the reference-signal generating unit 27 used in the solid-state imaging device 1A according to the first embodiment. FIG. 2B is a diagram for explaining gains in the AD conversion processing of the reference signal comparison type (AD conversion gains).

The DA conversion unit 270 includes a current source unit 302 including a combination of constant current sources, a counter unit 312, an offset generating unit 314, a current-source control unit 316, and a reference current source unit 330 that sets a reference current value I_0. The DA conversion unit 270 is a DA conversion circuit of a current output type. A resistance element 340 having resistance R_340 is connected to a current output end of the current source unit 302 as an element for current to voltage conversion. A current-voltage converting unit 301 includes the current source unit 302, the current source control unit 316, and the resistance element 340. A voltage generated at a connection point of the current source unit 302 and the resistance element 340 is used as the reference signal SLPadc.

The current source unit 302 includes the constant current sources 304 that output a specified current value. A way of setting current values of the constant current sources 304 of the current source unit 302 and a way of arraying and controlling the constant current sources 304 are various. To facilitate understanding, as an example, it is assumed that the constant current sources 304 include constant current sources 304 equivalent to bits and output an electric current having the weight of bits with respect to the reference current value I_0 set by the reference current source unit 330.

When the constant current sources 304 correspond to 12 bits, a constant current source 304_0 of a 0th bit outputs $2^0 \times I\_0$ ("^" indicates power), a constant current source 304_1 of a first bit outputs $2^1 \times I\_0$, ... and a constant current source 304_11 of an eleventh bit outputs $2^{11} \times I\_0$.

Current output ends of the constant current sources 304 are connected in common and further connected to a reference power supply Vref equivalent to an initial potential SLP_ini of the reference signal SLPadc via the resistance element 340. The reference power supply Vref is set on the basis of information indicating an initial value of the reference signal SLPadc for every comparison processing included in the control data CN_4. A circuit configuration for setting the reference power supply Vref may be any circuit configuration.

The reference current source unit 330 includes a constant current source 332, a Pch-type transistor 334 as a load of the constant current source 332, a gain changing unit 336, and an Nch-type transistor 338 that gives an electric current, which is output from the gain changing unit 336, to the constant current sources 304 of the current source unit 302. One end of the constant current source 332 is connected to a negative power supply and the ground. The constant current source 332 generates an initial current Iini. A source of the transistor 334 is connected to a positive power supply and a drain and a gate thereof are connected to an output end of the constant current source 332 in common and current-mirror-connected to a not-shown transistor of the gain changing unit 336.

Although details are not shown in the figure, the gain changing unit 336 supplies the reference current value I_0, which is obtained by multiplying a mirror current from the transistor 334 with a predetermined number, to the transistor 338. A source of the transistor 338 is connected the negative power supply or the ground and a drain and a gate thereof are connected to an output end of the gain changing unit 336 and current-mirror-connected to the constant current sources 304 of the current source unit 302.

The gain changing unit 336 sets a voltage change amount $\Delta$SLPdac ($=I\_0 \times R\_340$) per one clock on the basis of information for instructing a gradient of the reference signal SLPdac for every comparison processing included in the control data CN_4 and changes a count value by one for each count clock CKdac1. Actually, maximum voltage width only has to be set for a maximum number of counts (e.g., 1024 in 10 bits) of the count clock CKdac1.

When a gain with respect to the initial current amount Iini of the constant current source 332 of the reference current source unit 330 is changed, $\Delta$SLPdac per one count clock CKdac1 is adjusted. As a result, the gradient (a rate of change) of the reference signal SLPadc is adjusted. When the magnitude of $\Delta$SLPdac with respect to the count clock CKcnt1 on the AD conversion units 250 side is adjusted, in other words, when the number of count clocks CKcnt1 with respect to fixed $\Delta$SLPdac is adjusted, AD conversion gains can be adjusted.

As shown in (1) of FIG. 2B, step width $\Delta$SLP of the reference signal SLPdac per one count clock CKcnt1 (i.e., unit period) used by the counter units 254 is bit resolution. Therefore, the magnitude of the gradient of the reference signal SLPadc and a frequency (a count frequency Fcnt1) of the count clock CKcnt1 affect the bit resolution. When a frequency is set to 1/M with respect to the count frequency Fcnt1 in acquiring N bit accuracy, the count clock CKcnt1 is represented as count clock CKcnt1/M and the frequency is represented as count frequency Fcnt1/M.

As shown in (2) of FIG. 2B, when the count frequency Fcnt1 is fixed, the step width $\Delta$SLP is large and the bit resolution is coarse when the gradient of the reference signal SLPadc is steep. However, the step width $\Delta$SLP is small and the bit resolution is precise when the gradient of the reference signal SLPadc is gentle. In other words, whereas the number of count clocks with respect to the step width $\Delta$SLP is small and a gain is small when the gradient of the reference signal SLPadc is steep, the number of count clocks with respect to the step width $\Delta$SLP is large and a gain is large when the gradient of the reference signal SLPadc is gentle.

On the other hand, as shown in (3) of FIG. 2B, when the gradient of the reference signal SLPadc is fixed, the step width $\Delta$SLP is large and the bit resolution is coarse when the count frequency Fcnt1 is low. However, the step width $\Delta$SLP is small and the bit resolution is precise when the count frequency Fcnt1 is high. In other words, whereas the number of count clocks with respect to the step width $\Delta$SLP is small and a gain is small when the count frequency Fcnt1 is low, the number of count clocks with respect to the step width $\Delta$SLP is large and a gain is large when the count frequency Fcnt1 is high.

Both the systems shown in (2) and (3) of FIG. 2B indicate that gain adjustment can be performed during AD conversion by adjusting the number of count clocks with respect to a voltage change amount per unit time. Although not shown in the figure, the mechanism shown in (2) of FIG. 2B and the mechanism shown in (3) of FIG. 2B may be combined. In this embodiment, white balance adjustment is performed by using these characteristics. This point is explained in detail later.

The solid-state imaging device 1A according to the first embodiment adopts a method of fixing the frequency of the count clock CKcnt1 for the AD conversion units 250 and, as shown in (2) of FIG. 2B, adjusting the gradient of the reference signal SLPadc and adjusting AD conversion gains. Therefore, the control data CN_4 for gradient adjustment is supplied from the communication/timing control unit 20 to the DA conversion unit 270. The control data CN_4 is set on the basis of calculation for correcting an output amplitude characteristic difference (e.g., calculation of white balance adjustment).

In the first embodiment, the color separation filters in which the three colors R, G, and B are arranged in the Bayer array are used and Gr and Gb are the same color G. Therefore, assuming that there is no output amplitude characteristic difference, the same value is used for pixel signal voltages Vx_Gr and Vx_Gb in gain setting for white balance adjustment.

According to digital data after AD conversion, calculation of white balance adjustment is performed in a digital processing unit at a post stage on the basis of an output amplitude characteristic difference among the unit pixels 3 within a repetition unit (for each color separation filter array). In performing the calculation, white balance adjustment is not performed with a digital gain with respect to digital data having output information concerning colors. Instead, gain control data indicating a gain value desired to be adjusted for each of the colors is transmitted to the reference-signal generating unit 27.

The counter unit 312 performs count operation on the basis of the count clock CKdac1 from the communication/timing control unit 20 and supplies a count result to the current-source control unit 316. The offset generating unit 314 gives a fixed potential (an offset amount) to the reference signal SLPadc separately from a change based on a count value of the counter unit 312 and supplies information concerning the offset amount to the current-source control unit 316. The current-source control unit 316 determines, on the basis of the count value of the counter unit 312 and the information concerning the offset amount from the current-source control unit 316, which of the constant current sources 304 should be turned on or off. The current-source control unit 316 turns on or off the constant current source 304 on the basis of a result of the determination.

To facilitate understanding, it is assumed that the offset amount is zero unless specifically noted otherwise. Therefore, every time the count value of the counter unit 312 is incremented, the DA conversion unit 270 changes a voltage by ΔSLPdac for each count clock CKdac1 from a voltage indicating an initial value included in the control data CN_4. In the up-count operation, since the voltage falls by ΔSLPdac at a time, a gradient is a negative gradient. In the down-count operation, since the voltage rises by ΔSLPdac at a time, a gradient is a positive gradient.

The gradient of the reference signal SLPadc can be changed by changing any one of the specified current I_0 of the DA conversion unit 270, the resistance of the resistance element 340 for current to voltage conversion, and the count clock CKdac1 used by the counter unit 312 included in the DA conversion unit 270. Conversely, even when any one of the specified current I_0, the resistance, and the count clock CKdac1 is changed, the gradient can be set unchanged by applying correction in an opposite direction to the other elements.

To change the gradient of the reference signal SLPadc, a method of changing the count clock CKdac1 used by the counter unit 312 included in the DA conversion unit 270 without changing the specified current I_0 of the DA conversion unit 270 and the resistance of the resistance element 340 for current to voltage conversion is conceivable. This method is referred to as method of performing gradient change according to a change of the clock operation of the counter unit 312 of the DA conversion unit 270.

To realize the gradient change according to the change in the clock operation, for example, it is advisable to adopt a mechanism for multiplying the count clock CKdac1 with n/m in the clock converting unit 20a.

As another method of changing the gradient of the reference signal SLPadc for AD conversion, a method of changing the resistance of the resistance element 340 for current to voltage conversion without changing the specified current I_0 of the DA conversion unit 270 and the operation speed of the counter unit 312 included in the DA conversion unit 270 is also conceivable. This method is referred to as method of performing gradient change according to resistance switching of current to voltage conversion.

To realize the gradient change according to the switching of the resistance, for example, the resistance element 340 only has to be changed to a resistance switching circuit including plural resistance elements and switches. The resistance elements and the switches can take various circuit configurations according to an arbitrary combination of a series circuit and a parallel circuit. Any configuration may be adopted as long as the resistance during current to voltage conversion can be adjusted according to AD conversion gains desired to be obtained.

It is also possible to adopt a method of changing weight corresponding to the count value of the counter unit 312 by changing the specified current I_0 of the DA conversion unit 270 without changing the operation speed of the counter unit 312 included in the DA conversion unit 270 and the resistance of the resistance element 340 for current to voltage conversion. This method is referred to method of performing gradient change according to current switching of current to voltage conversion. To realize the method of performing gradient change according to current switching of current to voltage conversion, for example, it is advisable to adopt a configuration for adjusting the reference current value I_0 generated by the reference-current source unit 330 according to AD conversion gains desired to be obtained.

Basic Operation: First Embodiment

Figure 3B:
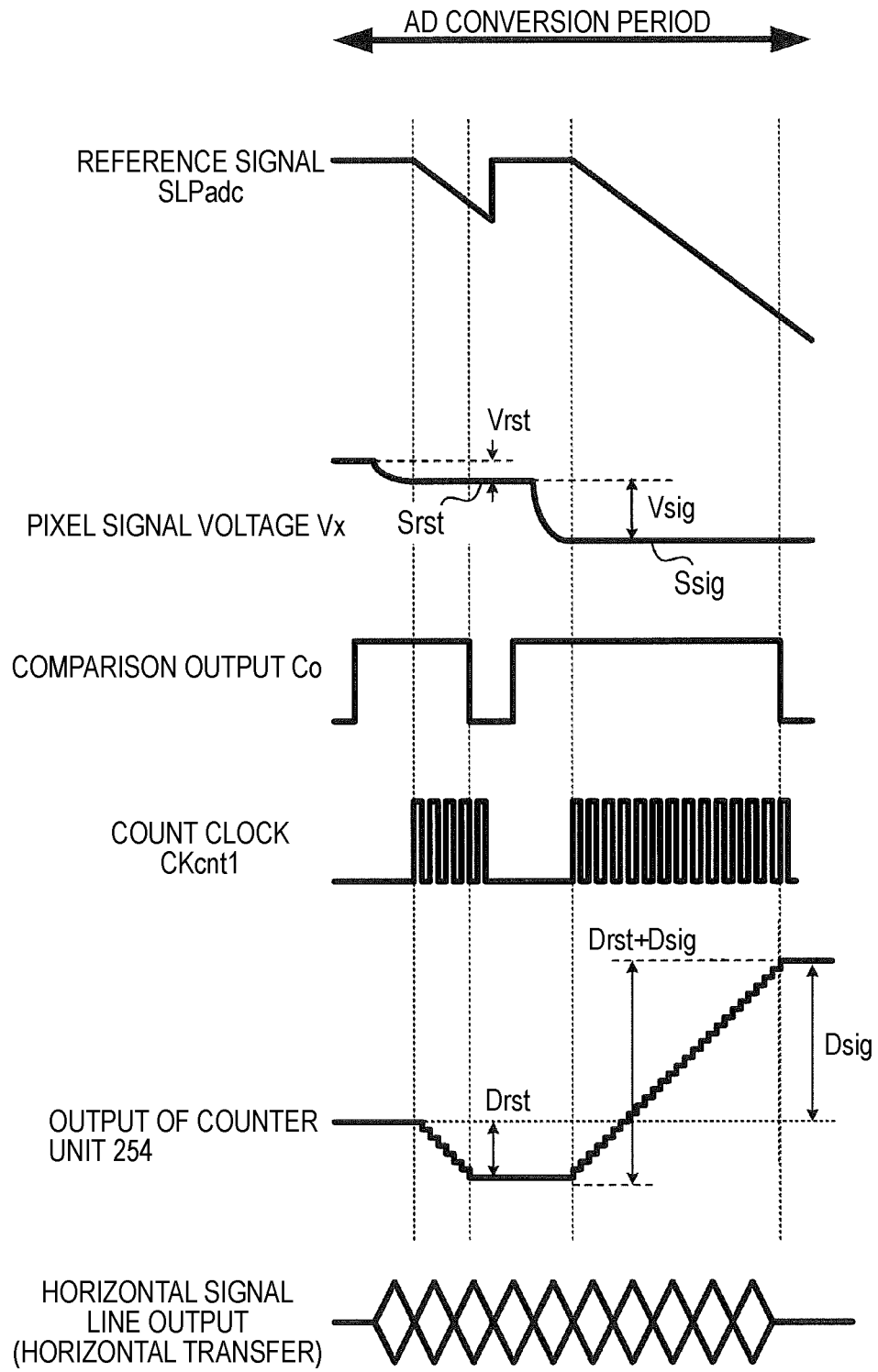
FIG. 3B is a timing chart for explaining AD conversion processing in the solid-state imaging device according to the first embodiment.

FIGS. 3A and 3B are diagrams for explaining basic operation of the solid-state imaging device 1A according to the first embodiment. FIG. 3A is a simple circuit diagram of the solid-state imaging device 1A with attention paid to AD conversion processing and CDS processing. FIG. 3B is a timing chart for explaining AD conversion processing in the solid-state imaging device 1A according to the first embodiment.

As shown in FIG. 3A, as an example, the pixel unit 3 includes, besides a charge generating unit 32, four transistors (a readout selection transistor 34, a reset transistor 36, a vertical selection transistor 40, and an amplification transistor 42) as basic elements included in the pixel-signal generating unit 5. The readout selection transistor 34 included in a transfer unit is driven by a transfer signal TRG via a transfer wire line 54. The reset transistor 36 included in an initializing unit is driven by a reset signal RST via a reset wire line 56. The vertical selection transistor 40 is driven by a vertical selection signal VSEL via a vertical selection line 58.

The charge generating unit 32 is an example of a detecting unit that detects a change in a physical quantity as charges. The pixel-signal generating unit 5 converts the charges detected by the charge generating unit 32 into the pixel signal voltage Vx. The readout selection transistor 34 is an example of a transfer unit that transfers, on the basis of an input transfer control potential (transfer signal TRG, the charges detected by the charge generating unit 32 to the pixel-signal generating unit 5. The reset transistor 36 is an example of an initializing unit that initializes the potential of the pixel-signal generating unit 5.

One end (an anode side) of a light receiving element DET of the charge generating unit 32 including the light receiving element DET such as a photodiode PD is connected to a reference potential Vss (a negative potential: e.g., about −1 V) on a low potential side and. The other end (a cathode side) thereof is connected to an input terminal (typically, a source) of the readout selection transistor 34. The reference potential Vss may be a ground potential GND. An output end (typically, a drain) of the readout selection transistor 34 is connected to a connection node to which the reset transistor 36, a floating diffusion 38, and the amplification transistor 42 are connected. A source of the reset transistor 36 is connected to the floating diffusion 38 and a drain thereof is connected to a reset power supply Vrd (usually, the same as the power supply Vdd).

A drain of the vertical selection transistor 40 is connected to a source of the amplification transistor 42, a source thereof is connected to a pixel line 51, and a gate (in particular, referred to as vertical selection gate SELV) thereof is connected to the vertical selection line 58. A gate of the amplification transistor 42 is connected to the floating diffusion 38, a drain thereof is connected to a power supply Vdd, and the source thereof is connected to the pixel line 51 via the vertical selection transistor 40 and connected to the vertical signal line 19. A connection configuration is not limited to such a connection configuration. The arrangement of the vertical selection transistor 40 and the amplification transistor 42 may be reversed. The drain of the vertical selection transistor 40 may be connected to the power supply Vdd, the source thereof may be connected to the drain of the amplification transistor 42, and the source of the amplification transistor 42 may be connected to the pixel line 51.

One end of the vertical signal line 19 extends to the column AD processing unit 26 side. The readout-current source unit 24 is connected in a path of the vertical signal line 19. Although details are not shown in the figure, the readout-current control unit 24 includes a load MOS transistor with respect to vertical columns. Gates are connected between the reference-current source unit and the transistor to form a current mirror circuit. The readout-current control unit 24 functions as the current source 24a with respect to the vertical signal line 19. A source follower configuration to which a substantially fixed operation current (readout current) is supplied is adopted between the readout-current control unit 24 and the amplification transistor 42.

The row control line 15 includes a transfer wire line 54, a reset wire line 56, and a vertical selection line 58. In the solid-state imaging device 1A according to the first embodiment, in the row direction, the pixel signal voltage Vx is supplied to the column AD processing unit 26 via one vertical signal line 19 for each color separation filter array. For this readout control, the row control lines for R 15_R connected in common to all the unit pixels 3 for R in the odd number rows and the row control lines for Gr 15_Gr connected in common to all the unit pixels 3 for Gr in the odd number rows are provided. The row control lines for Gb 15_Gb connected in common to all the unit pixels 3 for Gb in the even number rows and the row control lines for B 15_B connected in common to all the unit pixels 3 for B in the even number rows are provided. For every unit pixels 3 for two columns, pixel signal voltages Vx_R and Vx_Gr are selectively supplied (in the odd number rows) or pixel signal voltages Vx_Gb and Vx_B are selectively supplied (in the even number rows) to the AD conversion unit 250 of the column AD processing unit 26 via the vertical signal lines 19.

In the AD conversion unit 250, the pixel signal voltage Vx read out from the unit pixel 3 to the vertical signal line 19 is compared with the reference signal SLPadc in the comparing unit 252 of the AD conversion unit 250. As in the comparing unit 252, the counter unit 254 arranged for each of the vertical signal lines 19 is actuated on the basis of the count enable signal EN, a reference signal potential is changed in a one-to-one correspondence with the count operation, and the pixel signal voltage Vx of the vertical signal lines 19 is converted into digital data.

For example, in an example shown in FIG. 3B, a system for realizing differential processing in the P phase and the D phase by using the former half count system for the count operation effective period Ten and varying a count mode is adopted.

In a processing period in the P phase as an AD conversion period for the reset level Srst, count values of flip-flops of the counter unit 254 are reset to an initial value "0". The counter unit 254 is set in the down-count mode. Comparison processing of the reference signal SLPadc and a P-phase level of the pixel signal voltage Vx by the comparing unit 252 and count processing with the count clock CKcnt1 by the counter unit 254 are performed in parallel to perform AD conversion of the P-phase level. Consequently, a count value indicating a digital value (reset data) Drst corresponding to the magnitude of the reset level Srst (if a sign is taken into account, indicating –Drst) is held in the counter unit 254.

In a processing period in the D phase as an AD conversion processing for the signal level Ssig, in addition to the reset level Srst, the signal component Vsig corresponding to an incident light amount for each of the unit pixels 3 is read out, and operation same as the readout in the P phase is performed. The counter unit 254 is set in the up-count mode opposite to the mode during the P-phase processing. Comparison processing for the reference signal SLPadc and the D-phase level of the pixel signal voltage Vx by the comparing unit 252 and the count processing by the counter unit 254 are performed in parallel to perform AD conversion of the D-phase level.

With the digital value (the reset data) Drst of the reset level Srst of the pixel signal voltage Vx, which is acquired during the readout in the P phase and the AD conversion, set as a start point, up-count is performed as opposed to the P phase. Since the signal level Ssig is a level obtained by adding the signal component Vsig to the reset level Srst, a count value of an AD conversion result of the signal level Ssig is basically "Drst+ Dsig". However, since the start point of the up-count is "–Drst" as an AD conversion result of the reset level Srst, a count value actually held in the counter unit 254 is "–Drst+ (Dsig+Drst)=Dsig".

In other words, count modes of the count operation in the counter unit 254 are set different, i.e., down-count during processing in the P phase and up-count during processing in the D phase. Therefore, in the counter unit 254, differential processing is automatically performed between the number of counts "–Drst" as the AD conversion result of the reset level Srst and the number of counts "Drst+Dsig" as the AD conversion result of the signal level Ssig. The number of counts Dsig corresponding to a differential processing result is held in the counter unit 254. The number of counts Dsig held in the counter unit 254 corresponding to the differential processing result represents signal data corresponding to the signal component Vsig.

According to the differential processing in the counter unit 254 by the signal readout and the count processing performed twice, the reset level Srst including fluctuation for each of the unit pixels 3 can be removed. An AD conversion result of only the signal component Vsig corresponding to an incident light amount for each of the unit pixels 3 can be acquired by a simple configuration. Therefore, the AD conversion unit 250 operates not only as a digital conversion unit that converts an analog pixel signal into digital pixel data but also as a CDS processing function unit.

AD Conversion Gain Adjustment: First Embodiment

Figure 3C:
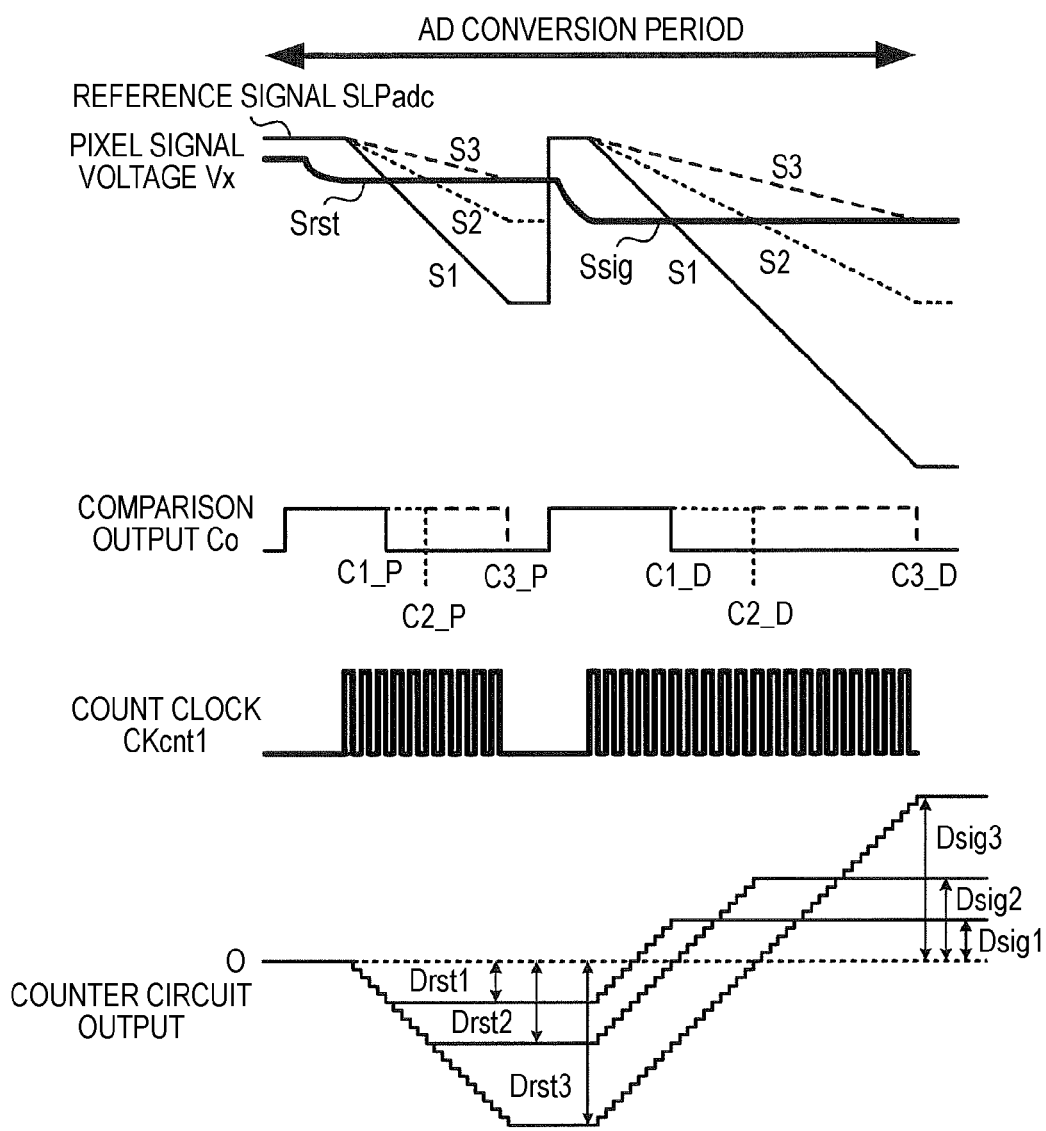
FIG. 3C is a timing chart for explaining AD conversion processing with attention paid to AD conversion gain adjustment of the solid-state imaging device according to the first embodiment.

FIG. 3C is a timing chart for explaining AD conversion processing with attention paid to AD conversion gain adjustment of the solid-state imaging device 1A according to the first embodiment.

As an example, it is assumed that the count clock CKcnt is fixed and AD conversion gain adjustment is performed by changing the voltage change amount ΔSLPdac per unit time of the voltage of the reference signal SLPadc in such a manner as S1, S2, and S3 throughout the P-phase processing and the D-phase processing. For example, when the voltage change amount ΔSLPdac per unit time of S1 in the timing chart shown in the figure is 1, a voltage change amount per unit time in S2 is S1/2 and a voltage change amount per unit time in S3 is S1/4.

First, operation performed when the voltage change amount ΔSLPdac per unit time of the voltage of the reference signal SLPadc is S1 is explained. In a processing period in the P phase, count values of the flip-flops of the counter unit 254 are reset to the initial value "0". The counter unit 254 is set in the down-count mode. Comparison processing of the reference signal SLPadc and a P-phase level of the pixel signal voltage Vx by the comparing unit 252 and count processing by the counter unit 254 are performed in parallel to perform AD conversion of the P-phase level. Comparison of the voltage of the reference signal SLPadc and the pixel signal voltage Vx is performed in the comparing unit 252. The comparing unit 252 reverses output from the H level to the L level at a point C1_P when both the voltages are the same. The counter unit 254 ends the AD conversion by performing counting from the start of a change in the reference signal SLPadc to the point when the output of the comparing unit 252 changes from the H level to the L level. Consequently, a count value indicating a digital value (reset data) Drst1 corresponding to the magnitude of the reset level Srst (if a sign is taken into account, indicating −Drst1) obtained when the voltage change amount ΔSLPdac is S1 is held in the counter unit 254.

In the following processing period in the D phase, in addition to the reset level Srst, the signal component Vsig corresponding to an incident light amount for each of the unit pixels 3 is read out and operation same as the readout in the P phase is performed. First, the counter unit 254 is set in the up-count mode opposite to the mode during the P-phase processing. Comparison processing for the reference signal SLPadc and the D-phase level of the pixel signal voltage Vx by the comparing unit 252 and the count processing by the counter unit 254 are performed in parallel to perform AD conversion of the D-phase level.

The comparing unit 252 reverses output from the H level to the L level at a point C1_D when both the voltages are the same. The counter unit 254 ends the AD conversion by performing counting from the start of a change in the reference signal SLPadc to the point when the output of the comparing unit 252 changes from the H level to the L level. Consequently, a count value indicating a digital value (reset data) corresponding to the magnitude of the signal level Ssig obtained when the voltage change amount ΔSLPdac is S1 is held in the counter unit 254.

With the digital value (the reset data) Drst1 of the reset level Srst of the pixel signal voltage Vx, which is acquired during the readout in the P phase and the AD conversion, set as a start point, up-count is performed as opposed to the P phase. Since the signal level Ssig is a level obtained by adding the signal component Vsig to the reset level Srst, a count value of an AD conversion result of the signal level Ssig obtained when the voltage change amount ΔSLPdac is S1 is basically "Drst1+Dsig1". However, since the start point of the up-count is "−Drst1" as an AD conversion result of the reset level Srst, a count value actually held in the counter unit 254 is "−Drst1+(Dsig1+Drst1)=Dsig1".

Operation performed when the voltage change amount ΔSLPdac per unit time of the voltage of the reference signal SLPadc is S2 is explained. Basically, in the same manner as the operation performed when the voltage change amount ΔSLPdac is S1, when the P-phase processing and the D-phase processing are performed, a count value indicating "−Drst2+(Dsig2+Drst2)=Dsig2" is held in the counter unit 254. A voltage change amount per unit time of S2 at this point is a half of that of S1. Therefore, a point C2_P when the reference signal SLPadc and the pixel signal voltage Vx are the same during the P-phase processing is later than the point C1_P when the voltage change amount is S1. A point C2_D when the reference signal SLPadc and the pixel signal voltage Vx are the same during the D-phase processing is later than the point C1_D when the voltage change amount is S1.

The same holds true when the voltage change amount ΔSLPdac per unit time of the voltage of the reference signal SLPadc is S3. When the P-phase processing and the D-phase processing are performed, a count value indicating "−Drst3+(Dsig3+Drst3)=Dsig3" is held in the counter unit 254. A voltage change amount per unit time of S3 at this point is a quarter of that of S1. Therefore, a point C3_P when the reference signal SLPadc and the pixel signal voltage Vx are the same during the P-phase processing is later than the point C1_P when the voltage change amount is S1 and the point C2_P when the voltage change amount is S2. A point C3_D when the reference signal SLPadc and the pixel signal voltage Vx are the same during the D-phase processing is later than the point C1_D when the voltage change amount is S1 and the point C2_D when the voltage change amount is S2.

The operations performed when the voltage change amount ΔSLPdac per unit time of the voltage of the reference signal SLPadc is S1 and S2 are compared. The voltage change amount ΔSLPdac of S2 of the reference signal SLPadc is a half of that of S1. Therefore, time from the change start point of the reference signal SLPadc to C2_P is twice as long as time from a change start point of the reference signal SLPadc to C1_P at the time when the voltage change amount ΔSLPdac of the reference signal SLPadc is S1. Time from the change start point of the reference signal SLPadc to C2_D is twice as long as time from the change start point of the reference signal SLPadc to C2_D at the time when the voltage change amount ΔSLPdac of the reference signal SLPadc is S1.

In other words, when the voltage change amount ΔSLPdac is S2, time during which the counter unit 254 counts the count clock CKcnt is twice as long as time during which the counter unit 254 counts the count clock CKcnt when the reference signal SLPadc, the voltage change amount ΔSLPdac of which is S1, is used. A count value at the time of S2 is twice as large as a count value at the time of S1. It is seen that, when the count clock CKcnt1 is fixed, output after AD conversion is doubled if the voltage change amount ΔSLPdac per unit time of the voltage of the reference signal SLPadc is halved by using the reference signal SLPadc of S2. Similarly, it is seen that, when the count clock CKcnt1 is fixed, output after AD conversion is quadrupled if the voltage change amount ΔSLPdac per unit time of the voltage of the reference signal SLPadc is quartered by using the reference signal SLPadc of S3.

$$Dsig1=-Drst1+(Dsig1+Drst1)$$

$$Dsig2=-Drst2+(Dsig2+Drst2)=-2*Drst1+(2*Dsig1+2*Drst1)=2*Dsig1$$

$$Dsig3=-Drst3+(Dsig3+Drst3)=-4*Drst1+(4*Dsig1+4*Drst1)=4*Dsig1$$

The above is the explanation of the driving method for AD conversion gain adjustment as a gain-up operation in the AD conversion processing of the reference signal comparison type. In this embodiment, white balance adjustment is performed by using AD conversion gain adjustment during the AD conversion processing of the reference signal comparison type. This point is explained below.

White Balance Adjustment: First Embodiment

First Example

FIG. 4A is a timing chart for explaining AD conversion processing with attention paid to white balance adjusting operation of a first example in the solid-state imaging device 1A according to the first embodiment.

Pixel signal voltages Vx of the unit pixels 3 in which the color separation filers including three color components of R, G (Gr, Gb), and B are arranged are sequentially read out at different times. For example, concerning the row direction, in odd number rows, first, only the row control lines for R 15_R are controlled, whereby pixel signal voltages Vx_R are simultaneously supplied from all the unit pixels 3 for R in the odd number rows to the column AD processing unit 26. Thereafter, when only the row control lines for Gr 15_Gr are controlled, pixel signal voltages Vx_Gr are simultaneously supplied from all the unit pixels 3 for Gr in the odd number rows to the column AD processing unit 26.

Subsequently, the solid-state imaging device 1A shifts to readout from even number rows. When only the row control lines for Gb 15_Gb are controlled, pixel signal voltages Vx_Gb are simultaneously supplied from all the unit pixels 3 for Gb in the even number rows to the column AD processing unit 26. Thereafter, when only the row control lines for B 15_B are controlled, pixel signal voltages Vx_B are simultaneously supplied from all the unit pixels 3 for B in the even number rows to the column AD processing unit 26.

The column AD processing unit 26 performs, according to the pixel signal voltages Vx_R, Vx_Gr, Vx_Gb, and Vx_B of the unit pixels 3 in which respective color filters are arranged, AD conversion gain adjustment to adjust white balance.

In the first embodiment, the color separation filters in which the three color filters for R, G, and B are arranged in the Bayer array are used. Since Gr and Gb are the same color G, in gain setting for white balance adjustment, the same value is used for the pixel signal voltages Vx_Gr and Vx_Gb.

The digital processing unit at the post-stage performs calculation of white balance adjustment on the basis of the digital data after the AD conversion. The digital arithmetic unit 29 shown in FIG. 1, a main control unit provided on the outside of the device, and the like correspond to the digital processing unit at the post stage. In performing calculation of white balance adjustment, the digital processing unit transmits the control data CN_4 for gain adjustment indicating a gain value desired to be adjusted for each of the colors to the reference-signal generating unit 27 via the communication/timing control unit 20 rather than applying, with a digital gain, white balance adjustment to the digital data having output information concerning the colors.

In AD-converting the pixel signal voltages for R Vx_R, the DA conversion unit 270 generates the reference signal SLPadc having a voltage change amount ΔSLPdac_R corresponding to the control data CN_4 for R gain adjustment. The AD conversion unit 250 performs comparison processing using the reference signal SLPadc of the voltage change amount ΔSLPdac_R and performs counting with the count clock CKcnt1 to AD-convert the pixel signal voltages for R Vx_R. Reset data Drst_R indicating a reset component of R Vrst_R after the P-phase processing is held in the counter unit 254. Signal data Dsig_R indicating a signal component of R Vsig_R after the D-phase processing is held in the counter unit 254.

In AD-converting the pixel signal voltages for Gr Vx_Gr, the DA conversion unit 270 generates the reference signal SLPadc having a voltage change amount ΔSLPdac_G corresponding to the control data CN_4 for G gain adjustment. The AD conversion unit 250 performs comparison processing using the reference signal SLPadc of the voltage change amount ΔSLPdac_G and performs counting with the count clock CKcnt1 to AD-convert the pixel signal voltages for Gr Vx_Gr. Reset data Drst_Gr indicating a reset component of Gr Vrst_Gr after the P-phase processing is held in the counter unit 254. Signal data Dsig_Gr indicating a signal component of Gr Vsig_Gr after the D-phase processing is held in the counter unit 254.

In AD-converting the pixel signal voltages for Gb Vx_Gb, the DA conversion unit 270 generates the reference signal SLPadc having the voltage change amount ΔSLPdac_G corresponding to the control data CN_4 for G gain adjustment. The AD conversion unit 250 performs comparison processing using the reference signal SLPadc of the voltage change amount ΔSLPdac_G and performs counting with the count clock CKcnt1 to AD-convert the pixel signal voltages for Gb Vx_Gb. Reset data Drst_Gb indicating a reset component of Gb Vrst_Gb after the P-phase processing is held in the counter unit 254. Signal data Dsig_Gb indicating a signal component of Gb Vsig_Gb after the D-phase processing is held in the counter unit 254.

In AD-converting the pixel signal voltages for B Vx_B, the DA conversion unit 270 generates the reference signal SLPadc having a voltage change amount ΔSLPdac_B corresponding to the control data CN_4 for B gain adjustment. The AD conversion unit 250 performs comparison processing using the reference signal SLPadc of the voltage change amount ΔSLPdac_B and performs counting with the count clock CKcnt1 to AD-convert the pixel signal voltages for B Vx_B. Reset data Drst_B indicating a reset component of B Vrst_B after the P-phase processing is held in the counter unit 254. Signal data Dsig_B indicating a signal component of B Vsig_B after the D-phase processing is held in the counter unit 254.

As horizontal transfer operation for pixel data for one row in the solid-state imaging device 1A according to the first embodiment in which the AD conversion unit 250 is provided for each color separation filter array, two methods explained below can be adopted. A first method is a method of adopting a configuration for storing pixel data for one column as the data storing units 256 and, as shown in FIG. 4A, performing horizontal transfer every time pixel data of R, Gr (in odd number rows) or Gb, and B (in even number row) is obtained. A second method is a method of adopting a configuration for individually storing pixel data for color separation filter arrays (in this example, two columns) in the row direction as the data storing units 256 and, although not shown in the figure, performing horizontal transfer after pixel data of R, Gr (in odd number rows) or Gb, and B (in even number rows) is obtained.

The first method has an advantage that the AD conversion units 250 can be reduced compared with the configuration in the past to which the first embodiment is not applied. On the other hand, when a frame rate is the same as that at the normal time, horizontal transfer needs to be performed at speed twice as high as the normal speed. The second method does not have the effect of reducing the AD conversion units 250 compared with the configuration in the past to which the first embodiment is not applied. However, even when a frame rate is the same as that in the configuration in the past, horizontal transfer only has to be performed at speed same as the normal speed.

By causing the solid-state imaging device 1A to operate with such driving methods, concerning the pixel signal voltages Vx_R, Vx_Gr, Vx_Gb, and Vx_B having information concerning the colors, gain adjustment can be performed according to output amplitude characteristics of the unit pixels 3 for R, G, and B during AD conversion. White balance adjustment can be performed together with the AD conversion.

In a solid-state imaging device mounted with an AD converter of a column parallel type in the past to which this embodiment is not applied, gain adjustment is performed in a domain of digital data after AD conversion and white balance is adjusted. Therefore, since data having color information subjected to digital gain adjustment does not have decimal information after the AD conversion, accuracy is lower than original AD conversion bit accuracy after the AD conversion. On the other hand, in the mechanism according to this embodiment, white balance is adjusted by performing gain adjustment during the AD conversion processing of the reference signal comparison type. Therefore, digital data after the white balance adjustment can keep the original AD conversion bit accuracy.

This example has a characteristic in that, when the number of count clocks with respect to the voltage change amount ΔSLPdac per unit time of the voltage of the reference signal SLPadc is adjusted to perform white balance adjustment, the white balance adjustment is realized by one DA conversion unit 270 adjusting the gradient of the reference signal SLPadc according to colors. When the fact that the original AD conversion bit accuracy can be kept is taken into account, characteristics of the colors can be precisely controlled. Therefore, there is an advantage that white balance can be precisely adjusted.

Comparison with a Comparative Example

It is conceivable to provide reference-signal generating units by color and AD-convert the pixel signal voltage Vx having information concerning the colors using individually generated plural reference signals SLPadc. However, in this case, since it is necessary to provide plural reference-signal generating units, there is a drawback in that a circuit size increases. Fluctuation occurs in the plural reference signals SLPadc generated by the individual reference-signal generating units because of fluctuation in the respective reference-signal generating units. Therefore, it is difficult to perform highly accurate gain adjustment. A large circuit size is expected for improvement of accuracy such as correction of the fluctuation in the respective reference-signal generating units.

In the first embodiment, concerning the row direction, each of the pixel signal voltages Vx having color information of the same color is read out in order and the gradient of the reference signal SLPadc is adjusted according to colors in one DA conversion unit 270. Therefore, a circuit size of the reference-signal generating units does not increase. Since it is unnecessary to take into account the influence of fluctuation in the reference-signal generating units, highly accurate white balance adjustment can be performed.

For example, in the mechanism disclosed in JP-A-2007-60671, as shown in FIGS. 1 and 2 thereof, a configuration of an image sensor having a column-parallel analog to digital converter is adopted. A lamp signal VRAMP used in a column-parallel analog converter is generated by a ramp-signal generating unit shown in FIG. 6A. The gradient of a ramp wave is controlled for each of colors (R, Gr, Gb, and B) by a circuit that controls the ramp-signal generating unit, whereby white balance and the like can be adjusted in a sensor. The adjustment of the gradient of the ramp wave is referred to as control of an analog gain.

A circuit shown in FIG. 9 of JP-A-2007-60671 has an analog gain set value for each of the colors. Switches 911, 921, 931, and 941 are changed over according to VRES and VSIG corresponding to R, Gr, Gb, and B shown in FIGS. 1 and 2 as targets of analog to digital conversion. The set value is used as a signal TGT to the ramp-signal generating unit shown in FIG. 6A and the gradient of the ramp signal VRAMP generated by the ramp-signal generating unit is changed. Therefore, analog gain adjustment for each color channel can be performed.

However, in JP-A-2007-60671, a pixel access configuration for simultaneously reading out pixel signals from all pixels for one row is adopted as shown in FIG. 2 of the patent document. Gb and B or Gr and B are simultaneously accessed. In this case, in the configuration of one ramp signal line VRAMP shown in FIG. 1, it is difficult to perform analog gain adjustment for each color. To perform analog gain adjustment or each color in the row direction, at least two ramp signal lines VRAMP are necessary. In other words, two ramp-signal generating units are necessary. When the two ramp-signal generating units are provided, a larger circuit size is expected for improvement of accuracy such as correction of fluctuation in the respective ramp-signal generating units.

In the mechanism disclosed in JP-A-2007-60080, as shown in FIG. 1 thereof, a configuration of an image sensor including ramp generating units (DA conversion units 27a) by color is adopted. As the ramp generating units, for example, a configuration shown in FIG. 12 of JP-A-2007-60080 is shown. Plural ramp-signal generating units corresponding to the colors are provided. The gradient of ramp signals generated by the ramp-signal generating units is changed according to signal amounts of the colors, switched by switches, and output. Analog to digital conversion for pixel signals output by vertical signal lines 19 shown in FIG. 1 of the document the colors is performed.

Like the mechanisms disclosed in JP-A-2007-60671, the mechanism disclosed in JP-A-2007-60080 is a configuration in which plural ramp-signal generating units are necessary. It is necessary to correct fluctuation in the plural ramp-signal generating units. Further, since outputs of the plural ramp-signal generating units are physically connected via the switches, there is a concern that the outputs of the plural ramp-signal generating units interfere with one another because of leakage from the switches and a proper analog gain is not obtained as white balance adjustment.

Second Example

FIG. 4B is a timing chart for explaining AD conversion processing with attention paid to white balance adjusting operation of a second example in the solid-state imaging device 1A according to the first embodiment.

In the white balance adjusting operation according to the first embodiment (the first example, Gr and Gb are treated as pixels having the color information of the same color G. When AD conversion for the pixel signal voltages Vx_Gr and Vx_Gb of Gr and Gb is performed, the same value is used for gain setting for white balance adjustment. Gain setting for the four unit pixels 3 forming the color separation filter of the Bayer array only has to be performed for the three colors R, G, and B. There is an advantage that gain setting control is simpler than individually setting gains for the four unit pixels 3.

However, because of refining of unit pixels, a difference between pixel layout patterns for Gr and Gb, and the like, when light having the same light amount is received, even if the colors are the same color G, a difference occurs in signal components Vsig_Gr and Vsig_Gb because of an output amplitude characteristic difference. Therefore, it is difficult to treat the colors.

In the first embodiment (the second example, measures against such a case is taken. In gain setting for white balance adjustment, separate values are used for the pixel signal voltages Vx_Gr and Vx_Gb. Specifically, a method of separately performing gain setting for the unit pixels 3 for four colors (R, Gr, Gb, and B) forming a color separation filter of the Bayer array is adopted.

In AD-converting the pixel signal voltage for R Vx_R, the DA conversion unit 270 generates the reference signal SLPadc having the voltage change amount ΔSLPdac_R corresponding to the control data CN_4 for R gain adjustment. The AD conversion unit 250 performs comparison processing using the reference signal SLPadc of the voltage change amount ΔSLPdac_R and performs counting with the count clock CKcnt1 to perform AD conversion.

In AD-converting the pixel signal voltage for Gr Vx_Gr, the DA conversion unit 270 generates the reference signal SLPadc having the voltage change amount ΔSLPdac_Gr corresponding to the control data CN_4 for Gr gain adjustment. The AD conversion unit 250 performs comparison processing using the reference signal SLPadc of the voltage change amount ΔSLPdac_Gr and performs counting with the count clock CKcnt1 to perform AD conversion.

In AD-converting the pixel signal voltage for Gb Vx_Gb, the DA conversion unit 270 generates the reference signal SLPadc having the voltage change amount ΔSLPdac_Gb corresponding to the control data CN_4 for Gb gain adjustment. The AD conversion unit 250 performs comparison processing using the reference signal SLPadc of the voltage change amount ΔSLPdac_Gb and performs counting with the count clock CKcnt1 to perform AD conversion.

In AD-converting the pixel signal voltage for B Vx_B, the DA conversion unit 270 generates the reference signal SLPadc having the voltage change amount ΔSLPdac_B corresponding to the control data CN_4 for B gain adjustment. The AD conversion unit 250 performs comparison processing using the reference signal SLPadc of the voltage change amount ΔSLPdac_B and performs counting with the count clock CKcnt1 to perform AD conversion.

AD conversion is applied to the pixel signal voltages Vx_Gr and Vx_Gb of the same color G by using the reference signals SLPadc of the individual voltage change amounts ΔSLPdac_Gr and ΔSLPdac_Gb to correct an output amplitude characteristic difference between the pixel signal voltages. Therefore, signal data Dsig_Gr and Dsig_Gb after D-phase processing have the same value.

By causing the solid-state imaging device 1A to operate with such driving methods, concerning the pixel signal voltages Vx_R, Vx_Gr, Vx_Gb, and Vx_B having information concerning the colors, gain adjustment can be performed according to the colors R, Gr, Gb, and B during AD conversion. As a result, white balance adjustment can be performed together with the AD conversion. Even when a characteristic difference occurs between the unit pixel 3 for Gr and the unit pixel 3 for Gb, the characteristic difference can be adjusted according to the voltage change amount ΔSLPdac_Gr and ΔSLPdac_Gb corresponding to the unit pixels 3 (i.e., AD conversion gains respectively for Gr and Gb).

As in the first embodiment (the first example, digital data after white balance adjustment can keep the original AD conversion bit accuracy and AD conversion gain adjustment for white balance adjustment is realized by one DA conversion unit 270 adjusting the gradient of the reference signal SLPadc according to the colors.

Third Example

FIGS. 4C and 4D are diagrams for explaining white balance adjustment of a third example in the solid-state imaging device 1A according to the first embodiment. FIG. 4C is a diagram for explaining color arrays of color separation filters applied in the third example. FIG. 4D is a timing chart for explaining AD conversion processing with attention paid to white balance adjustment operation of the third example in the solid-state imaging device 1A according to the first embodiment.

In the first example and the second example of the first embodiment, the three color components of R, G, and B are arrayed according to the basic form of the Bayer array with respect to the unit pixels 3 arranged in a square lattice shape. However, filter colors and arraying order of the filter colors are not limited to the basic form of the Bayer array. For example, an improvement of the Bayer array can be used or a complementary color filter or other filter colors can be used.

For example, as shown in (1) of FIG. 4C, in even number rows×odd number columns, third color pixels (white pixels W) for sensing white (W) as a third color may be arranged instead of green (G) pixels. Color pixels of two colors R and G or W and B different for each row are arranged in a checker pattern. In both the row direction and the column direction, an array of the color pixels is the same as the basic form of the Bayer array in that the two colors R and G or W and B are repeated in every two pixels. The unit pixels 3 in which W is arranged cause all components (R, G, and B) in a visible light band to pass. In this regard, in fact, a configuration without color filters can be adopted.

A purpose of using white (W) as the fourth color is to provide W pixels anew in addition to R, G, and B pixels in a configuration in which infrared light cut filters are used and attain high sensitivity according to a combination with an arithmetic algorithm. Since the W pixels have sensitivity higher than those of the R, G, and B pixels, high sensitivity can be attained by using signals of the W pixels as luminance signals.

Complementary color filters of cyan (Cy), magenta (Mg), and yellow (Ye) may be arranged in the Bayer array. For example, as shown in (2) of FIG. 4C, it is advisable to replace primary color filters R in odd number rows×odd number columns with cyan filters, replace primary color filters G in odd number rows×even number columns and even number rows×odd number columns with magenta filters, and replace primary color filters B in even number rows×even number columns with yellow filters. Color pixels of two colors of Cy and Mg or Mg and Ye different for each row are arranged in a checker pattern. In both the row direction and the column direction, an array of the color filters is the same as the basic form of the Bayer array in that the two colors Cy and Mg or Mg and Ye are repeated in every two pixels. Although not shown in the figure, the W pixel may be arranged in one of two magenta pixels that are diagonally present.

In general, a primary color system has higher color reproducibility than a complementary color system. The complementary color system is advantageous in terms of sensitivity because light transmittance of color filters is high. Specifically, since color filters of the complementary color system has sensitivity higher than that of color filters of the primary color system, sensitivity of an imaging apparatus can be improved by using color filters in the complementary color system in which transmitted lights in a visible region are complementary colors of the respective three primary colors. Conversely, there is an advantage that color signals of the primary colors can be acquired without performing differential processing and signal processing is simplified by using the color filters of the primary color system. When a video is reproduced, the signal processing is applied to colors signals (e.g., primary color signals of R, G, and B) obtained by using the color filters of the primary color system or the complementary color system and a luminance signal and a color difference signal are combined.

As shown in (3) of FIG. 4C, in even number rows×odd number columns, third color pixels for sensing a third color (emerald; E) may be arranged in stead of green (G) pixels. Color pixels of two colors R and G or E and B different for each row are arranged in a checker pattern. In both the row direction and the column direction, an array of the color pixels is the same as the basic form of the Bayer array in that the two colors R and G or E and B are repeated in every two pixels.

Although detailed explanation concerning color signal processing is omitted, an image processing processor that performs matrix arithmetic operation for creating three colors or R, G, and B close to colors recognized by human eyes from video signals of colors photographed with four colors is provided in association with color filters of four colors. The image processing processor may be provided in, for example, the digital arithmetic unit 29 or may be provided in the digital processing unit on the outside of the device. If an emerald filter is mounted in addition to red, green, and blue filters, a difference in color reproducibility can be reduced from that in the color filters for three colors. Reproducibility of cyan and red is improved.

In all the arrangement forms, AD conversion gains of four colors only have to be separately adjusted. Overall operation may be considered the same as the second example of the first embodiment. As gain setting for the four unit pixels 3 forming the color separation filter of the Bayer array, a method of separately performing the gain setting for the four unit pixels 3 only has to be adopted. The voltage change amount ΔSLPdac (=AD conversion gain) of the reference signal SLPadc emitted by the DA conversion unit 270 only has to be switched to a color of the color separation filter according to a difference in a combination of colors present in a processing target row. Effects same as those explained in the first example of the first embodiment can be realized in that, for example, DA conversion units can be reduced (only one DA conversion unit 270 is enough, a multiplexer is unnecessary, characteristics of the colors can be precisely controlled by adjusting the gradient of the reference signal SLPadc according to the colors.

For example, FIG. 4D is a diagram of an operation example performed when the white pixels W are arranged as shown in (1) of FIG. 4C. Since the white pixels W have sensitivity higher than that of the unit pixels 3 for R, G, and B, when accumulation times of the unit pixels 3 for R, G, B, and W are the same, a signal component Vsig W indicated by a pixel signal voltage Vx_W of the white pixels W is large. Therefore, AD conversion gains are set smaller for the pixel signal voltage Vx_W than the pixel signal voltages Vx_R, Vx_G, and Vx_B. Specifically, a voltage change amount for W ΔSLPdac_W is set larger than the voltage change amounts ΔSLPdac_R, ΔSLPdac_G, and ΔSLPdac_B for R, G, and B to increase the gradient of the reference signal SLPadc.

In AD-converting the pixel signal voltage for R Vx_R, the DA conversion unit 270 generates the reference signal SLPadc having the voltage change amount ΔSLPdac_R corresponding to the control data CN_4 for R gain adjustment. The AD conversion unit 250 performs comparison processing using the reference signal SLPadc of the voltage change amount ΔSLPdac_R and performs counting with the count clock CKcnt1 to perform AD conversion.

In AD-converting the pixel signal voltage for G Vx_G, the DA conversion unit 270 generates the reference signal SLPadc having the voltage change amount ΔSLPdac_G corresponding to the control data CN_4 for G gain adjustment. The AD conversion unit 250 performs comparison processing using the reference signal SLPadc of the voltage change amount ΔSLPdac_G and performs counting with the count clock CKcnt1 to perform AD conversion.

In AD-converting the pixel signal voltage for W Vx_W, the DA conversion unit 270 generates the reference signal SLPadc having the voltage change amount ΔSLPdac_W corresponding to the control data CN_4 for W gain adjustment. The AD conversion unit 250 performs comparison processing using the reference signal SLPadc of the voltage change amount ΔSLPdac_W and performs counting with the count clock CKcnt1 to perform AD conversion.

In AD-converting the pixel signal voltage for B Vx_B, the DA conversion unit 270 generates the reference signal SLPadc having the voltage change amount ΔSLPdac_B corresponding to the control data CN_4 for B gain adjustment. The AD conversion unit 250 performs comparison processing using the reference signal SLPadc of the voltage change amount ΔSLPdac_B and performs counting with the count clock CKcnt1 to perform AD conversion.

In this way, during AD conversion for the white pixels W, the AD conversion can be performed without output larger than outputs of the other R, G, and B unit pixels 3 overflowing.

2. Solid-State Imaging Device According to a Second Embodiment

Figure 5A:
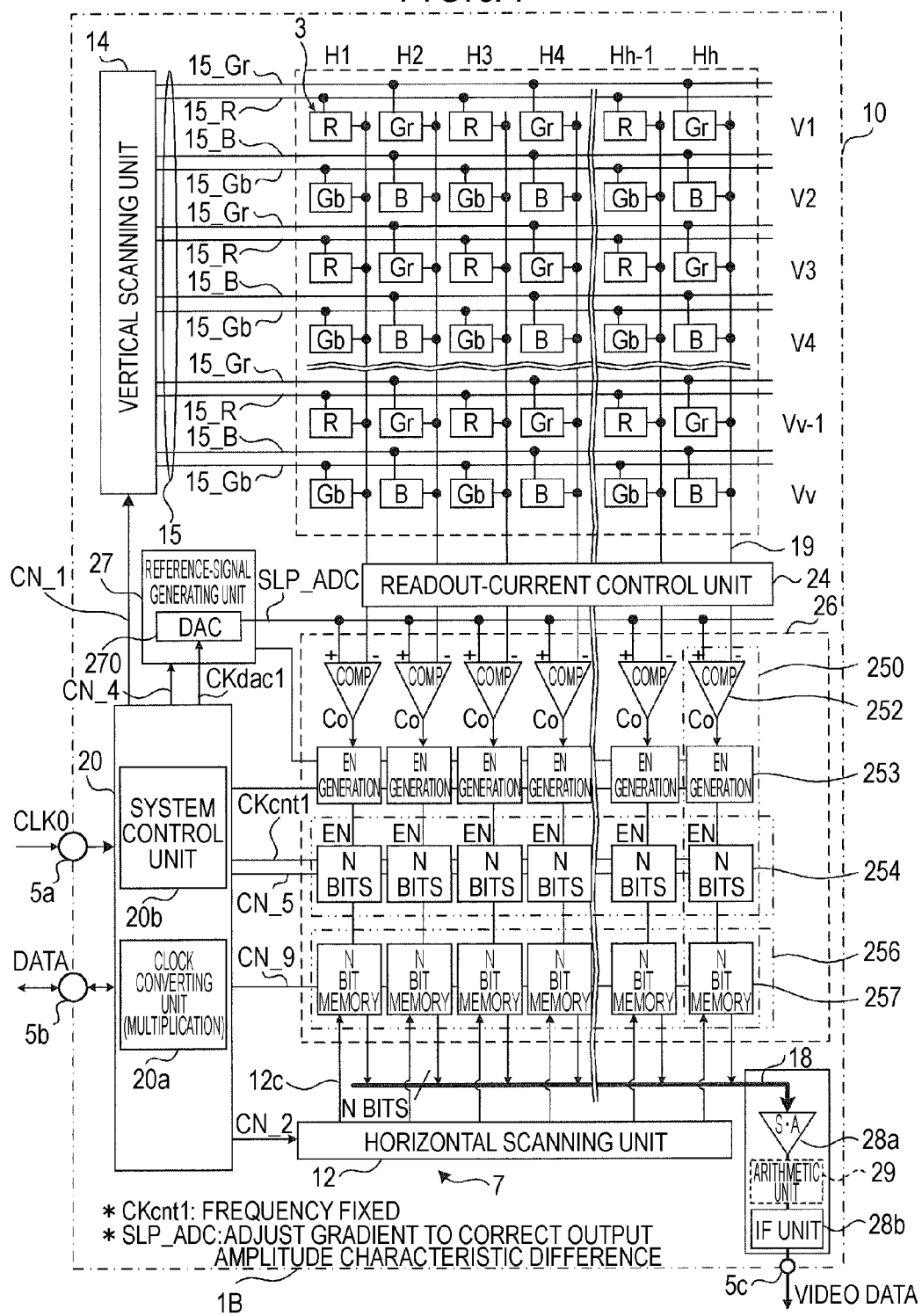
FIG. 5A is a schematic diagram of a CMOS solid-state imaging device according to a second embodiment of the present invention.

FIG. 5A is a schematic diagram of a CMOS solid-state imaging device (a CMOS image sensor) according to a second embodiment of the present invention.

First, as in the first embodiment, a solid-state imaging device 1B according to the second embodiment includes a pixel unit 10 having the row control lines 15 for the respective unit pixels 3 for the same colors. Concerning the connection relation between the pixel unit 10 and the column AD processing unit 26, in the second embodiment, the pixel signal voltage Vx is supplied to the AD conversion units 250 of the column AD processing unit 26 via one vertical signal line 19 for each vertical column.

White Balance Adjustment: Second Embodiment

FIG. 5B is a timing chart for explaining AD conversion processing with attention paid to white balance adjusting operation in the solid-state imaging device 1B according to the second embodiment.

The second embodiment is the same as the first embodiment except that the pixel signal voltage Vx is supplied to the AD conversion units 250 of the column AD processing unit 26 via one vertical signal line 19 for each vertical column rather than for each color separation filter array. The white balance adjusting operation during AD conversion processing only has to be the same as that in the first embodiment. As in the first embodiment (the second example), as gain setting for the unit pixels 3 for four colors (R, Gr, Gb, and B) forming a color separation filter of the Bayer array, a method of separately performing the gain setting for the unit pixels 3 for four colors is adopted.

Although detailed explanation is omitted, the second embodiment is the first embodiment in that digital data after white balance adjustment can keep the original AD conversion bit accuracy and AD conversion gain adjustment for white balance adjustment is realized by one DA conversion unit 270 adjusting the gradient of the reference signal SLPadc according to colors.

As horizontal transfer operation for pixel data for one row in the solid-state imaging device 1B according to the second embodiment, two methods explained below can be adopted. A first method is a method of performing horizontal transfer every time pixel data of R and Gr (in odd number rows) or Gb and B (in even number rows) is obtained. A second method is a method of performing horizontal transfer after both image data of R and Gr (in odd number rows) or Gb and B (even number rows) is obtained. Unlike the first embodiment, irrespective of whether the first or second method is adopted, the data storing unit 256 individually stores pixel data for a color separate filter array (in this example, for two columns) in the row direction. The methods are the same as those explained in the first embodiment. When the first method is adopted, the horizontal scanning unit 12 reads out data only from the latches 257 in odd number columns to the horizontal signal line 18 during horizontal transfer in odd number columns. The horizontal scanning unit 12 reads out data only from the latches 257 in even number columns to the horizontal signal line 18 during horizontal transfer in even number columns.

In comparison with the first embodiment, although the number of the AD conversion units 250 is doubled, the second embodiment has an advantage that the solid-state imaging device can be used in common as a solid-state imaging device for monochrome that does not use color separation filters. In monochrome imaging, it is unnecessary to read pixels in order in the row direction. As in the general column system, it is advisable to simultaneously read out pixel signals from all pixels in the row direction. In the device configuration according to the second embodiment, during monochrome imaging, if the row control lines for R and Gr 15_R and 15_Gr are driven by a common driving signal in odd number rows and the row control lines 15_Gb and 15_B for Gb and B are driven by a common driving signal in even number rows, it is possible to cope with the simultaneous readout of signals from all the pixels in the row direction.

3. Solid-State Imaging Device According to a Third Embodiment

Figure 6A:
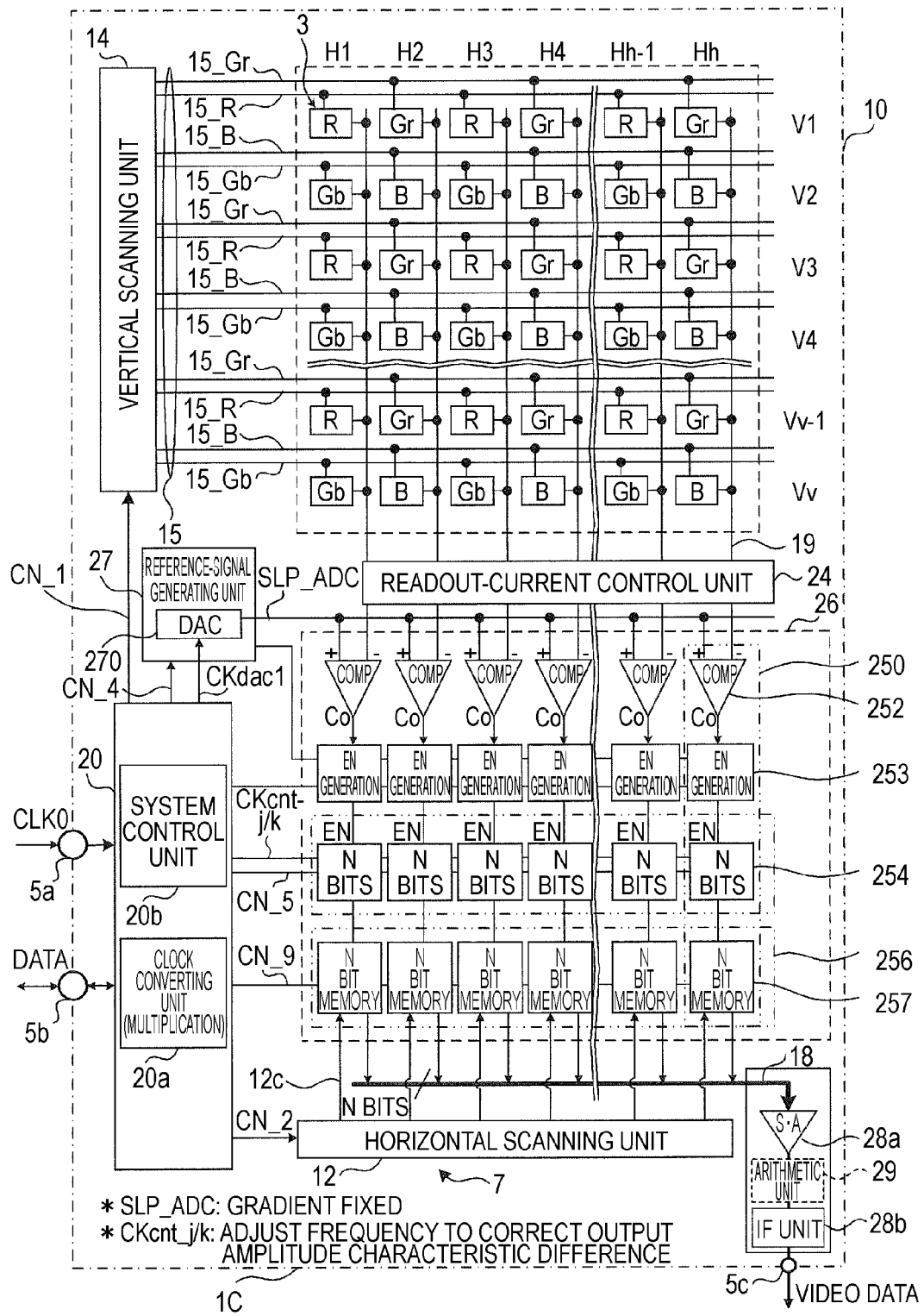
FIG. 6A is a schematic diagram of a CMOS solid-state imaging device according to a third embodiment of the present invention.

FIG. 6A is a schematic diagram of a CMOS solid-state imaging device (a CMOS image sensor) according to a third embodiment of the present invention. In the figure, the solid-state imaging device is shown as a modification to the second embodiment. However, the same mechanism can be applied to the first embodiment.

In the third embodiment, a method of adjusting AD conversion gains by adjusting the frequency of the count clock CKcnt1 for the AD conversion units 250 as shown in (3) of FIG. 2B while fixing the gradient of the reference signal SLPadc generated by the DA conversion unit 270. Therefore, in a solid-state imaging device 1C according to the third embodiment, a count clock CKcnt_j/k subjected to clock frequency adjustment is supplied from the communication/timing control unit 20 to the counter units 254 of the AD conversion units 250. The count clock CKcnt_j/k is a clock obtained by multiplying the reference clock (the count clock CKcnt1) with j/k. Like the control data CN_4, the count clock CKcnt_j/k is set on the basis of calculation of white balance adjustment.

For example, the digital processing unit at the post stage performs calculation of white balance adjustment on the basis of digital data after AD conversion. Information indicating a gain value desired to be adjusted for each of colors is transmitted to the communication/timing control unit 20. The communication/timing control unit 20 controls the clock converting unit 20a on the basis of the information to acquire the adjusted count clock CKcnt_j/k, which is j/k times as large as the count clock CKcnt1, and supplies the count clock CKcnt_j/k to the counter units 254.

White Balance Adjustment: Third Embodiment

Figure 6B:
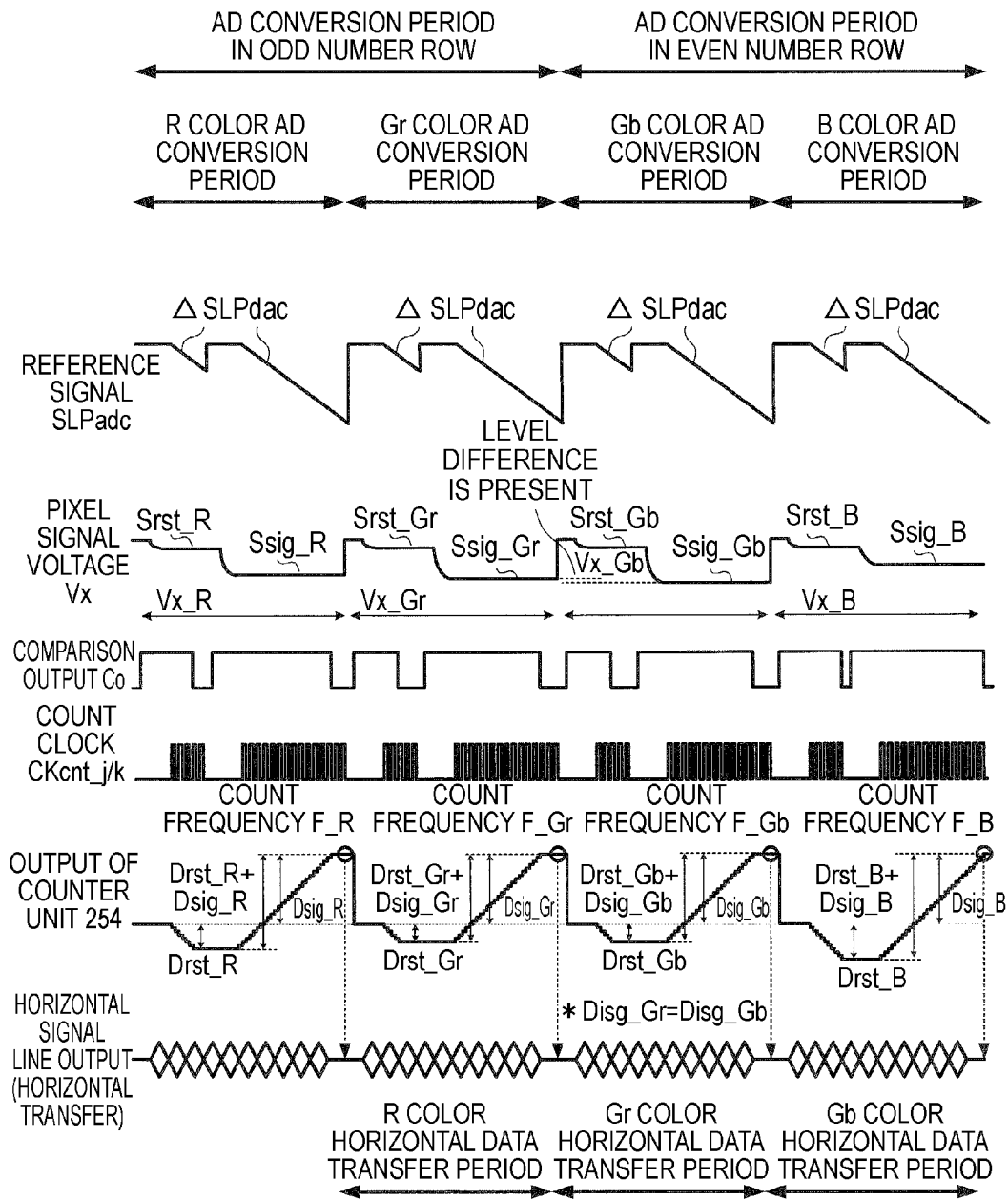
FIG. 6B is a timing chart for explaining AD conversion processing with attention paid to white balance adjusting operation in the solid-state imaging device according to the third embodiment.

FIG. 6B is a timing chart for explaining AD conversion processing with attention paid to white balance adjusting operation in the solid-state imaging device 1C according to the third embodiment.

The third embodiment is the same as the first embodiment except that the DA conversion unit 270 adjusts AD conversion gains by adjusting a count frequency in use. AD conversion processing and CDS processing only have to be the same as those in the first embodiment.

As in the first embodiment (the second example), as gain setting for the unit pixels 3 for four colors (R, Gr, Gb, and B) forming a color separation filter of the Bayer array, a method of separately performing the gain setting for the unit pixels 3 for four colors is adopted.

In AD-converting the pixel signal voltage for R Vx_R, the DA conversion unit 270 generates the reference signal SLPadc having the voltage change amount ΔSLPdac. The AD conversion unit 250 performs AD conversion according to count processing based on the count clock CKcnt_j/k having a count frequency F_R for R gain adjustment. In AD-converting the pixel signal voltage for Gr Vx_Gr, the DA conversion unit 270 generates the reference signal SLPadc having the voltage change amount ΔSLPdac. The AD conversion unit 250 performs AD conversion according to count processing based on the count clock CKcnt_j/k having a count frequency F_Gr for Gr gain adjustment.

In AD-converting the pixel signal voltage for Gb Vx_Gb, the DA conversion unit 270 generates the reference signal SLPadc having the voltage change amount ΔSLPdac. The AD conversion unit 250 performs AD conversion according to count processing based on the count clock CKcnt_j/k having a count frequency F_Gb for Gb gain adjustment. In AD-converting the pixel signal voltage for B Vx_B, the DA conversion unit 270 generates the reference signal SLPadc having the voltage change amount ΔSLPdac. The AD conversion unit 250 performs AD conversion according to count processing based on the count clock CKcnt_j/k having a count frequency F_B for B gain adjustment.

In the third embodiment, AD conversion gain adjustment for white balance adjustment is realized by the AD conversion unit 250 adjusting the frequency of the count clock CKcnt in use according to colors. Digital data after white balance adjustment is the same as that in the first embodiment in that the original AD conversion bit accuracy can be kept.

It is conceivable to provide clock generating units by color that generate count clocks CKcnt of frequencies different according to the colors and supply the count clocks CKcnt to the AD conversion units 250 and to AD-convert the pixel signal voltage Vx having information concerning the colors using the individually-generated plural count clocks CKcnt of different frequencies. In this case, since it is necessary to provide plural clock generating units, there is a drawback in that a circuit size increases.

In the third embodiment, the AD conversion unit 250 adjusts frequencies of the count clocks CKcnt in use according to the colors simultaneously with reading out the pixel signal voltages Vx having information concerning the same colors in order. As in the first embodiment, highly accurately white balance adjustment can be performed without the drawback of the increase in a circuit size and the influence of fluctuation in the reference-signal generating units.

4. Solid-State Imaging Device According to a Fourth Embodiment

Figure 7A:
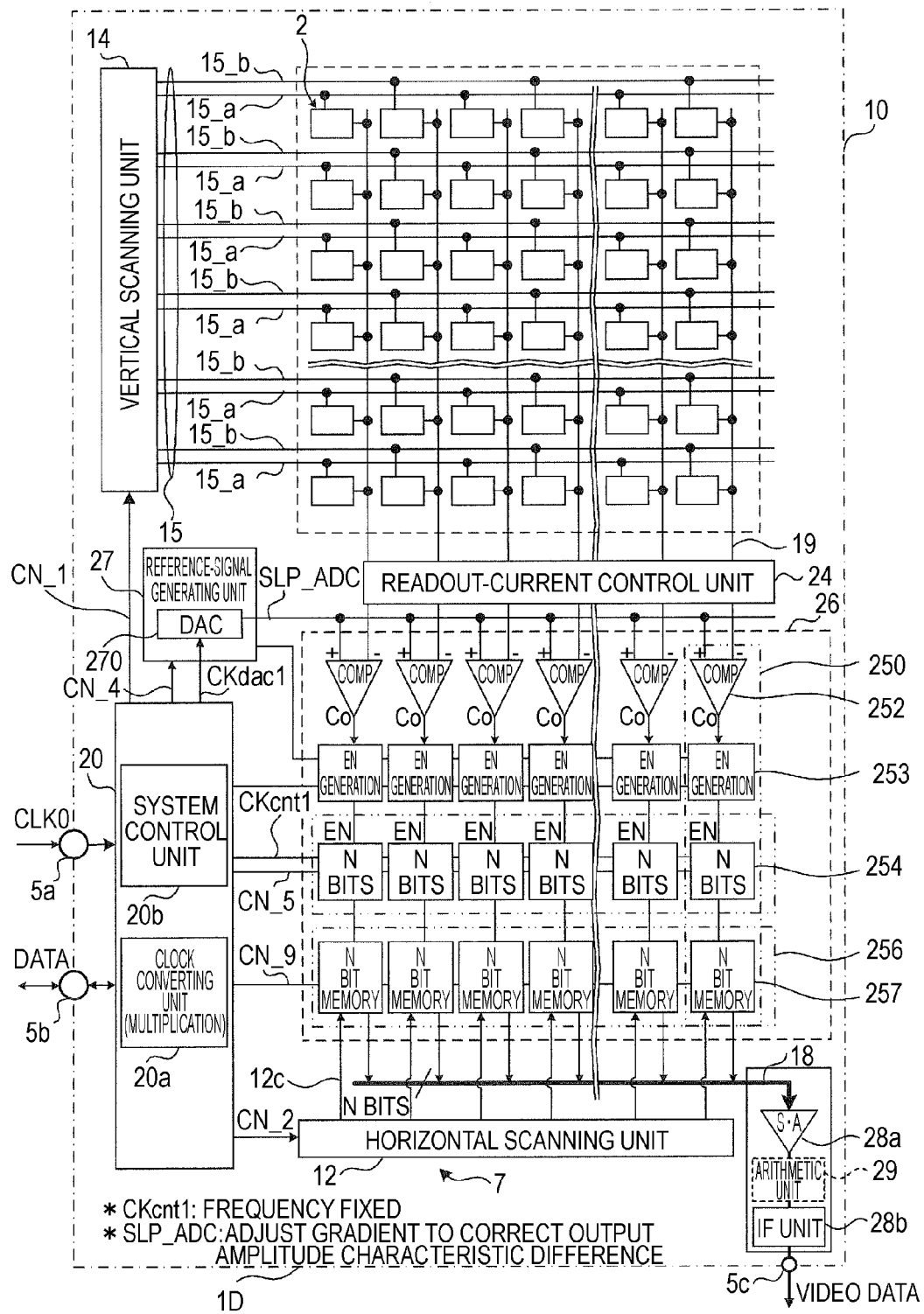
FIG. 7A is a schematic diagram of a CMOS solid-state imaging device according to a fourth embodiment of the present invention.

FIG. 7A is a schematic diagram of a CMOS solid-state imaging device (a CMOS image sensor) according to a fourth embodiment of the present invention. In the figure, the solid-state imaging device is shown as a modification to the first embodiment for performing AD conversion gain adjustment in gradient adjustment for the reference signal SLPadc. However, the same modification is possible for the third embodiment for performing AD conversion gain adjustment in clock frequency adjustment for AD conversion.

As shown in FIG. 7A, in a solid-state imaging device 1D according to the fourth embodiment, unit pixel groups 2 of a pixel shared structure having a configuration in which plural unit pixels 3 share a part of elements in a unit pixel 3 are included in the pixel unit 10.

In the fourth embodiment, the pixel signal voltage Vx is supplied to the column AD processing unit 26 via one vertical signal line 19 for each of the unit pixel groups 2. Therefore, a row control line 15_a controlled for each of the unit pixel groups 2 and a row control line 15_b controlled for each of the unit pixels 3 in the unit pixel group 2 are provided. Components other than the pixel unit 10 are the same as those in the first embodiment.

Although details are explained later, the fourth embodiment is the same as the first embodiment in that, when the Bayer array is applied during color imaging, concerning the row direction, "each color separation filter array" is formed by two columns. Concerning the connection relation between the pixel unit 10 and the column AD processing unit 26, as in the first embodiment, one AD conversion unit 250 may be provided for each color separation filter array in the row direction. Alternatively, as in the second embodiment, one AD conversion unit 250 may be provided for each vertical column. The example shown in the figure is indicated by a configuration example same as that in the second embodiment. (2) of FIG. 7D referred to later is indicated by a configuration example same as that in the first embodiment.

Circuit Configuration of a Unit Pixel Group

Figure 7B:
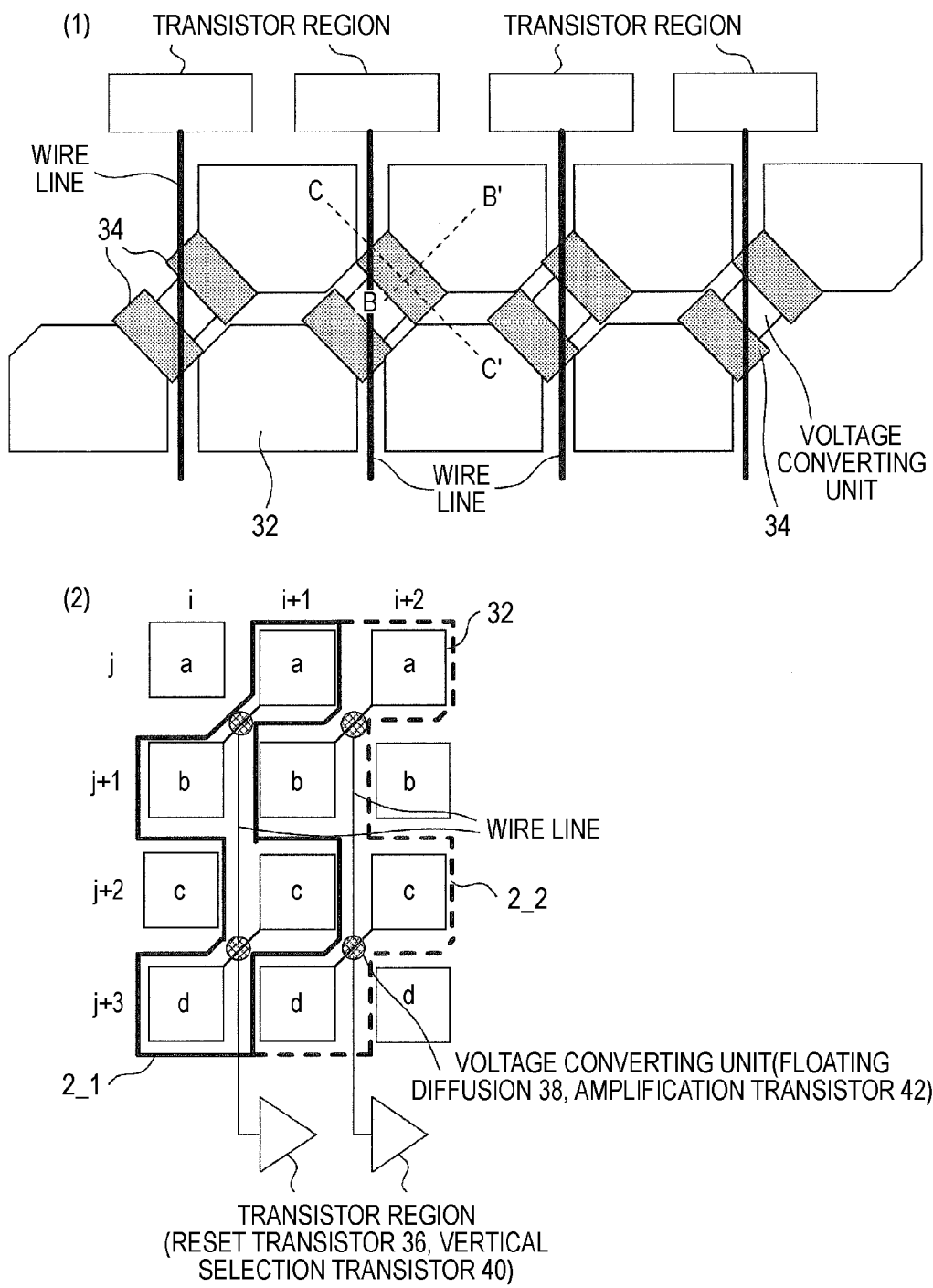
FIG. 7B shows diagrams of an arrangement layout example of components of unit pixel groups included in the solid-state imaging device according to the fourth embodiment.
Figure 7C:
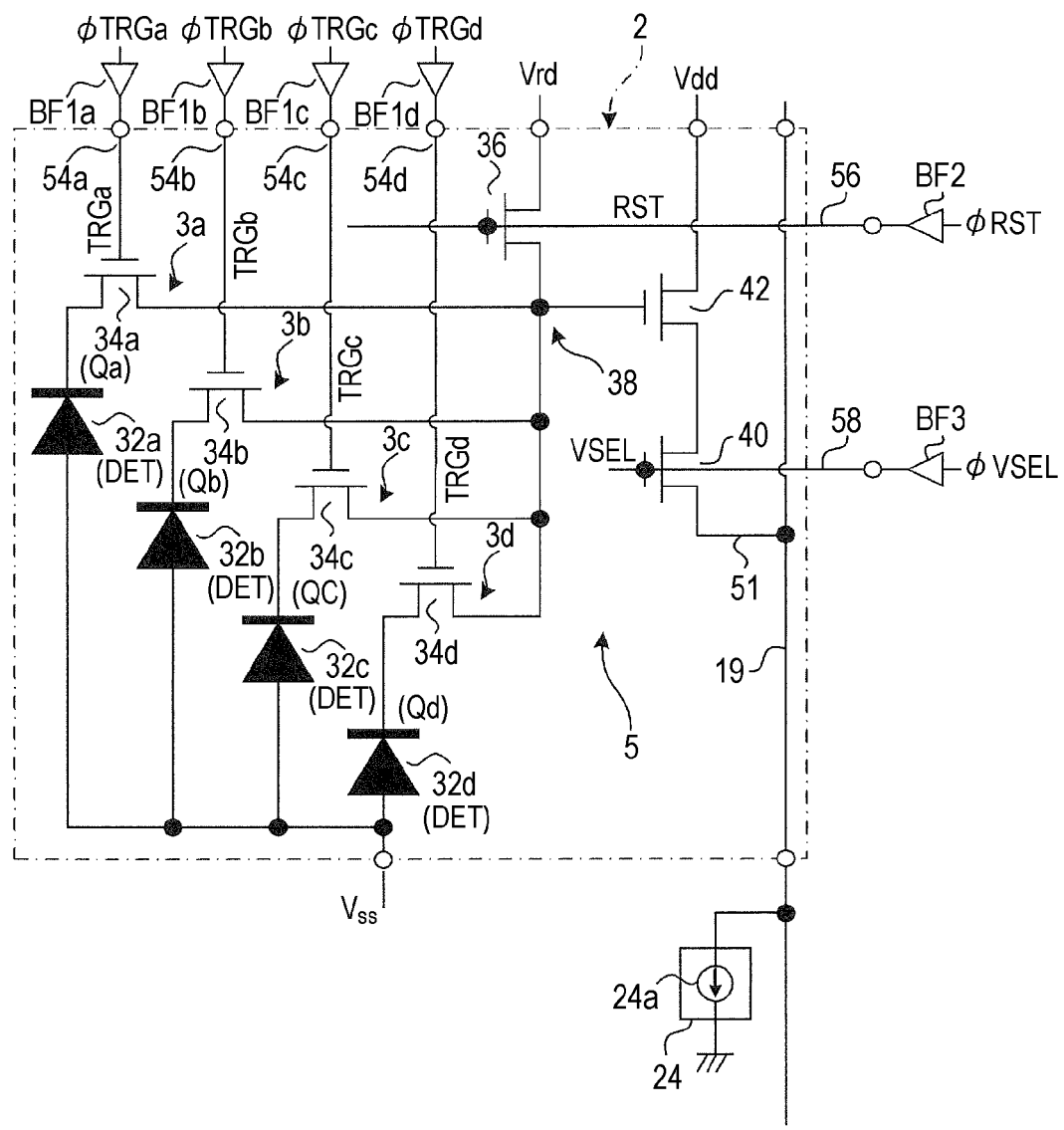
FIG. 7C is a diagram of a circuit configuration example of a unit pixel group and a connection form of driving units, driving control lines, and pixel transistors.

FIGS. 7B and 7C are diagrams for explaining a configuration example of the unit pixel group 2 used in the solid-state imaging device 1D according to the fourth embodiment shown in FIG. 7A. FIG. 7B is a diagram of an arrangement layout example of components forming the unit pixel group 2. FIG. 7C is a diagram of a circuit configuration example of the unit pixel group 2 and a connection form of a driving unit, driving control lines, and pixel transistors. First, a configuration of the unit pixel group 2 in the pixel unit 10 has a characteristic in that the unit pixel group 2 has a pixel sharing structure including a configuration in which plural unit pixels 3 share a part of elements in a unit pixel 3. A basic configuration of the unit pixels 3 forming the unit pixel group 2 in the pixel unit 10 is the same as that of the unit pixels 3 according to the first embodiment.

As an example of the pixel sharing structure, four-pixel sharing for forming the unit pixel group 2 with a combination of four unit pixels 3 is explained. This is similar to one color separation filter formed by four unit pixels 3 in 2 rows×2 columns when the color separation filters of the Bayer array are used.

The configuration of the unit pixel group 2 is only an example and is not limited to this. In the configuration shown in FIGS. 7B and 7C, one unit pixel group 2 includes four unit pixels 3. However, the number of unit pixels 3 is not limited to this. For example, one unit pixel group 2 may include two or eight unit pixels 3.

In terms of a layout, as shown in FIG. 7B, the unit pixel group 2 includes transistor regions, voltage converting units, and wire lines that electrically connect the voltage converting units and circuit groups in the transistor regions. In the transistor regions, charge generating units 32, voltage converting units that convert signal charges generated by the charge generating unit 32 into voltage signals, readout selection transistors 34, and circuit groups for applying processing to charges transferred to the voltage converting units and the voltage signals converted by the voltage converting units are arranged. As shown in FIG. 7C, the voltage converting unit includes, as main units, a floating diffusion 38 and an amplification transistor 42 of a source follower configuration as an example of a detection element that detects a potential change in the floating diffusion 38.

The unit pixel group 2 has a substantial characteristic in an arrangement layout of the components. As shown in (1) of FIG. 7B, with respect to the charge generating units 32 arranged in a two-dimensional array shape including plural columns and plural rows, one voltage converting unit is arranged between two charge generating units 32 obliquely adjacent to each other in the two-dimensional array. The two charge generating units 32 share one voltage converting unit and one transistor region via the readout selection transistors 34 annexed to the charge generating units 32.

As the sharing, for example, as shown in (2) of FIG. 7B, a combination is determined in a two-dimensional array including i, i+1, i+2, ... columns and j, j+1, j+2, ... rows. For example, in a first unit pixel group 2_1, a charge generating unit 32a at a (i+1, j) coordinate and a charge generating unit 32b at a (i, j+1) coordinate share a voltage converting unit including one floating diffusion 38 and one amplification transistor 42. A charge generating unit 32c at a (i+1, j+2) coordinate and a charge generating unit 32d at a (i, j+3) coordinate share a voltage converting unit including another floating diffusion 38 and another amplification transistor 42.

In a second unit pixel group 2_2 adjacent in the row direction, the charge generating unit 32a at a (i+2, j) coordinate and the charge generating unit 32b at a (i+1, j+1) coordinate share a voltage converting unit including one floating diffusion 38 and one amplification transistor 42. The charge generating unit 32c at a (i+2, j+2) coordinate and the charge generating unit 32d at a (i+1, j+3) coordinate share a voltage converting unit including another floating diffusion 38 and another amplification transistor 42.

As shown in FIG. 7B, the transistor region is provided between the charge generating units 32 for which the voltage converting units are not arranged. A circuit group in the transistor region is shared by two charge generating units 32 electrically connected to each other via a wire line. In the unit pixel groups 2, when the voltage converting unit shared by the charge generating units 32a and 32b and the voltage converting unit shared by the charge generating units 32c and 32d are connected, the charge generating units 32a, 32b, 32c, and 32d arranged in zigzag in four rows and two columns share the same voltage converting unit. As the circuit group shared at this point, as shown in FIG. 7C, there is the reset transistor 36 and the vertical selection transistor 40. It is assumed that these circuit elements are arranged to be distributed in plural transistor regions.

In the solid-state imaging device 1D according to the forth embodiment, two voltage converting units arranged along the same column direction share a set of circuit groups arranged to be distributed in two transistor regions arranged along the column direction of the two-dimensional array. Two charge generating units 32 adjacent to each other in the two-dimensional array share the voltage converting unit. The unit pixel group 2 as one sharing unit (unit block) includes the one circuit group, the two voltage converting units, and the four charge generating units 32 in total.

In terms of circuit configuration, the unit pixel group 2 includes four charge generating units 32a, 32b, 32c, and 32d. One pixel-signal generating unit 5 including the floating diffusion 38 and the amplification transistor 42 is shared. It is assumed that pixels to be shared are adjacent to each other. When the unit pixels 3 are arrayed in a square lattice shape, an adjacent direction may be any one of the vertical direction, the horizontal direction, and both the vertical and horizontal directions (i.e., an oblique direction). FIG. 7B is only an example.

To share the pixel-signal generating unit 5 of an FDA configuration with four pixels, one unit pixel group 2 includes four unit pixels 3. Therefore, the readout selection transistor 34 functions as means for transferring signal charges accumulated in four charge generating units 32 to the common pixel-signal generating unit 5. As the readout selection transistor 34, readout selection transistors 34*a*, 34*b*, 34*c*, and 34*d* are independently provided. As a transfer driving buffer BF1, transfer driving buffers BF1*a*, BF1*b*, BF1*c*, and BF1*d* are independently provided. Signal charges Qa, Qb, Qc, and Qd are independently transferred from the charge generating units 32*a*, 32*b*, 32*c*, and 32*d* to the floating diffusion 38. As the row control line 15_*a* controlled for each of the unit pixel groups 2, there are a reset wire line 56 and a vertical selection line 58. As the row control line 15_*b* controlled for each of the unit pixels 3 in the unit pixel group 2, there are transfer wire lines 54*a*, 54*b*, 54*c*, and 54*d*.

Concerning a unit pixel 3*a* (a first pixel), when the readout selection transistor 34*a* is driven by a transfer signal TRGa via the transfer wire line 54*a*, a pixel signal voltage Vx_a is read out. Concerning a unit pixel 3*b* (a second pixel), when the readout selection transistor 34*b* is driven by a transfer signal TRGb via the transfer wire line 54*b*, a pixel signal voltage Vx_b is read out. Concerning a unit pixel 3*c* (a third pixel), when the readout selection transistor 34*c* is driven by a transfer signal TRGc via the transfer wire line 54*c*, a pixel signal voltage Vx_c is read out. Concerning a unit pixel 3*d* (a fourth pixel), when the readout selection transistor 34*d* is driven by a transfer signal TRGd via the transfer wire line 54*d*, a pixel signal voltage Vx_d is read out.

The first unit pixel 3*a* includes the charge generating unit 32*a*, the readout selection transistor 34*a*, and the pixel-signal generating unit 5. The second unit pixel 3*b* includes the charge generating unit 32*b*, the readout selection transistor 34*b*, and the pixel-signal generating unit 5. The third unit pixel 3*c* includes the charge generating unit 32*c*, the readout selection transistor 34*c*, and the pixel-signal generating unit 5. The fourth unit pixel 3*d* includes the charge generating unit 32*d*, the readout selection transistor 34*d*, and the pixel-signal generating unit 5. In other words, in such a configuration, the unit pixel group 2 is formed by seven transistors as a whole. From the viewpoint of the respective charge generating units 32*a*, 32*b*, 32*c*, and 32*d*, a 4Tr configuration in which the unit pixel 3 includes four transistors is adopted.

Relation Between a Pixel Sharing Structure and Color Imaging

FIG. 7D is a diagram for explaining color imaging in the solid-state imaging device 1D having the pixel sharing structure shown in FIGS. 7A to 7C. When the solid-state imaging device 1D is used for color imaging, the unit pixel 3 to be shared may be configured such that the pixel-signal generating unit 5 of the FDA configuration is shared not only by pixels of the same colors but also by plural colors or may be configured such that the pixel-signal generating unit 5 of the FDA configuration is shared by only the pixels of the same colors.

However, depending on a sharing system, in a combination with the method in the past for simultaneously reading out pixel signals in the row direction, when gain adjustment (white balance adjustment during color imaging) by pixels is performed, a separate circuit configuration for generating and supplying reference signals with different gradients is necessary. Alternatively, a separate circuit configuration for generating and supplying count clocks CKcnt with different frequencies is necessary. In both the cases, there is a drawback in that a circuit size increases.

For example, in FIG. 7D, primary color filters of R, Gr, Gb, and B are arranged in the Bayer array and the unit pixel group 2 includes four unit pixels 3 arranged in zigzag in four rows and two columns. (1) of FIG. 7D is a diagram of a comparative example in which the pixel signal voltages Vx are simultaneously read out in the row direction. (2) of FIG. 7D is a diagram of the fourth embodiment in which, concerning the row direction, as in the first (to third) embodiment(s), each of the pixel signal voltages Vx having color information concerning the same colors is read out in order.

In a correspondence relation with FIG. 7B, in the first pixel unit group 2_1, the charge generating units 32*a* and 32*c* are R pixels and the charge generating units 32*b* and 32*d* are B pixels. In the second unit pixel group 2_2, the charge generating units 32*a* and 32*c* are Gr pixels and the charge generating units 32*b* and 32*d* are Gb pixels.

In the case of the comparative example shown in (1) of FIG. 7D, when pixel signals are read out from R and Gr rows, pixel signals R and Gr are simultaneously read out. When pixel signals are read out from Gb and B rows, pixel signals Gb and B are simultaneously read out. When AD conversion gain adjustment for each of the colors is performed by gradient adjustment for the reference signal SLPadc in order to simultaneously read out the pixel signals R and Gr or Gb and B, two reference-signal generating units 27 (DA conversion units 270) are necessary. When AD conversion gain adjustment for each of the colors is performed by frequency adjustment for the count clock CKcnt of the column AD processing unit 26 (the AD conversion unit 250) in order to simultaneously read out the pixel signals R and Gr or Gb and B, individual count clock generating circuits that generates the count clocks CKcnt having different frequencies are necessary.

On the other hand, in the case of the fourth embodiment shown in (2) of FIG. 7D, concerning the row direction, each of the pixel signal voltages Vx having color information concerning the same colors is read out in order and the number of count clocks on the counter side with respect to the voltage change amount ΔSLPdac per unit time of the voltage of the reference signal SLPadc is individually adjusted according to the readout of the pixel signal voltage Vx. The fourth embodiment is the same as the first to third embodiments in this regard. Concerning a repetition unit of an array in the row direction (the horizontal direction), in the case of this example, the repetition unit is considered to be each repetition unit of the color array of the unit pixel group 2. However, actually, the fourth embodiment is the same as the first embodiment in that the repetition unit is a repetition unit of a color array in the horizontal direction of the unit pixel 3.

AD Conversion Gain Adjustment: Fourth Embodiment

FIG. 7E is a timing chart for explaining AD conversion processing with attention paid to AD conversion gain adjusting operation (white balance adjusting operation) in the solid-state imaging device 1D according to the fourth embodiment. As in the first embodiment, AD conversion gain adjustment is performed in gradient adjustment for the reference signal SLPadc. Although not shown in the figure, as in the third embodiment, AD conversion gain adjustment may be performed in frequency adjustment for the count clock CKcnt.

When the pixel sharing structure is adopted, for example, there is a difference among layout patterns of the unit pixels 3 including refining of the unit pixels 3. Therefore, when lights of the same light amount are received, it is difficult to treat the lights in the same manner because a difference occurs among the pixel signal voltages Vx_a, Vx_b, Vx_c, and Vx_d and output amplitude characteristics are different. In the fourth embodiment, measures are taken against such a case. AD conversion gains are separately adjusted concerning the pixel signal voltages Vx_a, Vx_b, Vx_c, and Vx_d readout from the unit pixels 3a, 3b, 3c, and 3d included in the unit pixel group 2. Overall operation is the same as that in the second example of the first embodiment. A method of separately performing gain setting for the four unit pixels 3a, 3b, 3c, and 3d included in the unit pixel group 2 only has to be adopted.

In other words, since output amplitude characteristics of the unit pixels 3 present in the unit pixel group 2 are different, the voltage change amount ΔSLPdac (i.e., an AD conversion gain) of the reference signal SLPadc emitted by the DA conversion unit 270 only has to be switched according to the output amplitude characteristics of the unit pixels 3 included in the unit pixel group 2.

For example, in AD-converting the pixel signal voltages Vx_a and Vx_c (=Vx_R) of the unit pixels 3a and 3c of the first unit pixel group 2_1, the DA conversion unit 270 generates the reference signal SLPadc having the voltage change amount for R pixels ΔSLPdac_R. The AD conversion unit 250 performs comparison processing using the reference signal SLPadc of the voltage change amount ΔSLPdac_R and performs counting with the count clock CKcnt1 to perform AD conversion.

In AD-converting the pixel signal voltages Vx_a and Vx_c (=Vx_Gr) of the unit pixels 3a and 3c of the second unit pixel group 2_2, the DA conversion unit 270 generates the reference signal SLPadc having the voltage change amount for Gr pixels ΔSLPdac_Gr. The AD conversion unit 250 performs comparison processing using the reference signal SLPadc of the voltage change amount ΔSLPdac_Gr and performs counting with the count clock CKcnt1 to perform AD conversion.

In AD-converting the pixel signal voltages Vx_b and Vx_d (=Vx_Gb) of the unit pixels 3b and 3d of the second unit pixel group 2_2, the DA conversion unit 270 generates the reference signal SLPadc having the voltage change amount for Gb pixels ΔSLPdac_Gb. The AD conversion unit 250 performs comparison processing using the reference signal SLPadc of the voltage change amount ΔSLPdac_Gb and performs counting with the count clock CKcnt1 to perform AD conversion.

In AD-converting the pixel signal voltages Vx_b and Vx_d (=Vx_B) of the unit pixels 3b and 3d of the first unit pixel group 2_1, the DA conversion unit 270 generates the reference signal SLPadc having the voltage change amount for B pixels ΔSLPdac_B. The AD conversion unit 250 performs comparison processing using the reference signal SLPadc of the voltage change amount ΔSLPdac_B and performs counting with the count clock CKcnt1 to perform AD conversion.

During AD conversion concerning the pixel signal voltages Vx read out from the unit pixels 3 included in the unit pixel group 2, gain adjustment can be performed according to output amplitude characteristics of the unit pixels 3. As a result, output amplitude characteristic correction can be performed together with the AD conversion. Even when a difference occurs in output amplitude characteristics of the unit pixels 3, the characteristic difference can be adjusted according to voltage change amounts ΔSLPdac_a, ΔSLPdac_b, ΔSLPdac_c, and ΔSLPdac_d (i.e., AD conversion gains by unit pixels 3) corresponding thereto.

When attention is paid to white balance adjustment, concerning the pixel signal voltages Vx_R and Vx_Gr or the pixel signal voltages Vx_Gb and Vx_B having different kind of color information in the row direction, gain adjustment can be performed according to output amplitude characteristics of the unit pixels 3 for R, G, and B during AD conversion. White balance adjustment can be performed together with the AD conversion. Therefore, in the column AD processing unit 26, AD conversion gain adjustment for white balance adjustment can be highly accurately realized without increasing a circuit size of the reference-signal generating unit and the count clock generating circuit (in this example, the clock converting unit 20a).

In the example explained above, the unit pixel groups 2 are arranged in zigzag in four rows and two columns and shared. However, this is not indispensable. In (2) of FIG. 7B, even in the case of vertical four-pixel sharing in which the first unit pixel group 2_1 includes the charge generating units 32a, 32b, 32c, and 32d in an ith column and the second unit pixel group 2_2 includes the charge generating units 32a, 32b, 32c, and 32d in an i+1th column, the mechanism according to the fourth embodiment is applied in the same manner.

The fourth embodiment is the same as the first embodiment in that digital data after AD conversion gain adjustment (white balance adjustment) can keep the original AD conversion bit accuracy and the AD conversion gain adjustment is realized by one DA conversion unit 270 adjusting the gradient of the reference signal SLPadc according to output amplitude characteristics.

5. Imaging Apparatus According to a Fifth Embodiment

FIG. 8 is a diagram for explaining a fifth embodiment of the present invention. In the fifth embodiment, the mechanism of AD conversion processing with gain adjustment adopted by the solid-state imaging device 1 according to the embodiments explained above is applied to an imaging apparatus, which is an example of a physical information acquiring apparatus. FIG. 8 is a schematic diagram of an imaging apparatus 8 according to the fifth embodiment.

In the imaging device, as in the solid-state imaging device, it is possible to realize, by performing gain adjustment during the AD conversion processing of the reference signal comparison type, the mechanism for correcting an output amplitude characteristic difference for each of the unit pixels 3 without increasing the size of the DA conversion unit 270 (the reference-signal generating unit 27) and the circuit that generates the count clock CKcnt. As control concerning AD conversion gain adjustment such as setting of the gradient of the reference signal SLPadc and the frequency of the count clock CKcnt for gain adjustment, a main control unit on the outside can designate instruction information for the control according to data setting for the communication/timing control unit 20. Control of the normal AD conversion processing of the reference signal comparison type for not performing AD conversion gain adjustment processing can also be performed.

For example, the imaging apparatus 8 includes a photographing lens 802, an optical low-pass filter 804, a color filter group 812, the pixel unit 10, the driving control unit 7, the column AD processing unit 26, the reference-signal generating unit 27, and a camera-signal processing unit 810. As indicated by a dotted line in the figure, an infrared light cut filter 805 that reduces infrared light components can be provided together with the optical low-pass filter 804.

The photographing lens 802 guides light L representing an image of a subject Z under illumination to the imaging apparatus side and focuses the light L. In the color filter group 812, color filters for R, G, and B are arranged in the Bayer array. The driving control unit 7 drives the pixel unit 10. The read-out-current control unit 24 controls an operating current of a pixel signal output from the pixel unit 10. The column AD processing unit 26 applies CDS processing, AD conversion processing, and the like to the pixel signal output from the pixel unit 10. The reference-signal generating unit 27 supplies a reference signal SLP ADC to the column AD processing unit 26. The camera-signal processing unit 810 processes an imaging signal output from the column AD processing unit 26.

The camera-signal processing unit 810 provided at a post stage of the column AD processing unit 26 includes an imaging-signal processing unit 820 and a camera control unit 900 functioning as a main control unit that controls the entire imaging apparatus 8. The imaging-signal processing unit 820 includes a signal separating unit 822, a color-signal processing unit 830, a luminance-signal processing unit 840, and an encoder unit 860.

The signal separating unit 822 has a primary color separating function for separating a digital imaging signal, which is supplied from an AD conversion function unit of the column AD processing unit 26 when filters other than primary color filters are used as color filters, into primary color signals of R (red), G (green), and B (blue). The color-signal processing unit 830 performs signal processing concerning a color signal C on the basis of the primary color signals R, G, and B separated by the signal separating unit 822. The luminance-signal processing unit 840 performs signal processing concerning a luminance signal Y on the basis of the primary color signals R, G, and B separated by the signal separating unit 822. The encoder unit 860 generates a video signal VD on the basis of the luminance signal Y and the color signal C.

Although not shown in the figure, the color-signal processing unit 830 includes a gamma correction unit and a color difference matrix unit. Although not shown in the figure, the luminance-signal processing unit 840 includes a high-frequency luminance-signal generating unit, a low-frequency luminance-signal generating unit, and a luminance-signal generating unit. The high-frequency luminance-signal generating unit generates a luminance signal YH including even components having relatively high frequencies on the basis of the primary color signals supplied from the primary color separation function unit of the signal separating unit 822. The low-frequency luminance-signal generating unit generates a luminance signal YL including only components having relatively low frequencies on the basis of the primary color signals. The luminance-signal generating unit generates the luminance signal Y on the basis of the two kinds of luminance signals YH and YL and supplies the luminance signal Y to the encoder unit 860.

After digitally modulating color difference signals R-Y and B-Y with a digital signal corresponding to a color signal sub-carrier, the encoder unit 860 combines the color difference signals R-Y and B-Y with the luminance signal Y generated by the luminance-signal processing unit 840 and converts a combined signal into a digital video signal VD (=Y+S+C; S is a synchronization signal and C is a chroma signal). The digital video signal VD output from the encoder unit 860 is supplied to a camera-signal output unit at a post stage not shown in the figure and served for monitor output, data recording in a recording medium, and the like. The digital video signal VD is converted into an analog video signal V by DA conversion.

The camera control unit 900 includes a microprocessor 902, a ROM 904 as a read-only storing unit, a RAM 906, and other peripheral members not shown in the figure. The microprocessor 902 is the same as a core of a computer represented by a CPU in which functions of arithmetic operation and control performed by the computer are integrated in a micro integrated circuit. The RAM 906 is an example of a random-access volatile storage unit. The microprocessor 902, the ROM 904, and the RAM 906 are collectively referred to as microcomputer.

The camera control unit 900 controls the entire system. In a relation with AD conversion gain adjustment (e.g., white balance adjustment) for correcting an output amplitude characteristic difference for each of the unit pixels 3, the camera control unit 900 has, for example, a calculation function for white balance adjustment. Further, the camera control unit 900 has a function of adjusting the gradient of the reference signal SLP ADC and the frequency of the count clock CKcnt.

A control program and the like for the camera control unit 900 are stored in the ROM 904. In particular, in this example, a program for controlling, with the camera control unit 900, the normal AD conversion processing of the reference signal comparison type and AD conversion gain adjustment processing for correcting an output amplitude characteristic difference is stored. Data and the like for the camera control unit 900 performing various kinds of processing are stored in the RAM 906.

A recording medium 924 such as a memory card can be inserted in and removed from the camera control unit 900. The camera control unit 900 can be connected to a communication network such as the Internet. The camera control unit 900 includes a memory readout unit 907 and a communication I/F 908 besides the microprocessor 902, the ROM 904, and the RAM 906. The recording medium 924 is used for registering program data for causing the microprocessor 902 to perform software processing and data for exposure control processing based on a luminance signal, AD conversion gain adjustment processing for white balance adjustment, and the like. The memory readout unit 907 stores data read out from the recording medium 924 in the RAM 906. The communication I/F 908 mediates exchange of communication data between the camera control unit 900 and the communication network such as the Internet.

In the imaging apparatus 8, the driving control unit 7 and the column AD processing unit 26 are shown as module-like units separately from the pixel unit 10. However, a one-chip solid-state imaging device 1 in which these units are integrally formed on a semiconductor substrate together with the pixel unit 10 may be used. In the figure, the imaging apparatus 8 is shown in a state including optical systems such as the photographing lens 802 besides the pixel unit 10, the column AD processing unit 26, and the camera-signal processing unit 810. This form is suitable to adopt a module-like form having an imaging function in which these units are collectively packaged.

Although not shown in the figure, the solid-state imaging device 1 may be provided in a module-like form having the imaging function in a state in which the pixel unit 10 and the optical systems such as the photographing lens 802 are collectively packaged. In this case, in addition to the solid-state imaging device 1 provided in the module-like form, the camera-signal processing unit 810 may also be provided in the module to configure the entire imaging apparatus 8. As a form of a module in the solid-state imaging device 1, the camera-signal processing unit 810 may be included. In this case, in fact, the solid-state imaging device 1 and the imaging apparatus 8 can be regarded as the same. Such an imaging apparatus 8 is provided as, for example, a camera or a portable apparatus having an imaging function for performing "imaging". "Imaging" includes not only capturing of an image during normal camera photographing but also fingerprint detection and the like in a broader sense.

The imaging apparatus 8 having such a configuration is configured to include all the functions of the solid-state imaging device 1. The imaging apparatus 8 is the same as the solid-state imaging device 1 in the basic configuration and operation. The microprocessor 902 performs calculation of white balance adjustment on the basis of digital data after AD conversion input from the column AD processing unit 26 and transmits gain control data indicating a gain value desired to be adjusted for each of the colors to the reference-signal generating unit 27 via the driving control unit 7 (the communication/timing control unit 20). In the imaging apparatus 8 according to this embodiment, a mechanism for performing not only the normal AD conversion processing of the reference signal comparison type but also AD conversion gain adjustment processing for correcting an output amplitude characteristic difference can be realized.

The present invention has been explained with reference to the embodiments. However, the technical scope of the present invention is not limited to the range described in claims. Various modifications and alterations of the embodiments are possible without departing from the spirit of the present invention. Forms subjected to such modifications and alterations are also included in the technical scope of the present invention.

The embodiments do not limit the inventions according to claims. All the combinations of the characteristics explained in the embodiments are not always indispensable for the solving means of the present invention. Inventions at various stages are included in the embodiments. Various inventions can be extracted according to appropriate combinations in disclosed plural elements. Even if several elements are deleted from all the elements described in the embodiments, a configuration from which the several elements are deleted can be extracted as an invention as long as effects are obtained.

In the embodiments, the solid-state imaging device in which the unit pixels 3 of the square shape are arrayed in the square lattice shape and the color separation filter including 2×2 pixels as a repetition unit are provided is explained. However, the repetition unit of the color separation filter is not limited to this. In the case of 3×2 pixels, concerning three pixels as a repetition unit in the row direction, a system for providing the row control line 15 for each of the unit pixels 3 of the same colors, reading out each of the pixel signal voltages Vx having color information concerning the same colors in order, and converting the pixel signal voltage Vx into digital data only has to be adopted.

In the embodiments, the solid-state imaging device in which the unit pixels 3 of the square shape are arrayed in the square lattice shape is explained. However, the array of the unit pixels is not limited to the square lattice shape. For example, the array may be a skew lattice shape of an array state in which the pixel unit 10 shown in FIG. 1 is tilted 45 degrees. The array of the unit pixels is not limited to the square shape and may be a honeycomb shape to suppress a reduction in areas of light receiving surfaces of the charge generating units of the unit pixels and improve pixel density.

Irrespective of the shape and the array of the unit pixels, in any case, when the pixel unit 10 is formed to be applicable to color imaging, in a direction corresponding to readout units simultaneously accessed in the configuration in the past, AD conversion gains only have to be adjusted in association with color filters present within the repetition unit of the color separation filters. In short, white balance only has to be adjusted by adjusting AD conversion gains according to output amplitude characteristics of the unit pixels 3 by color filters present within the repetition unit of the color separation filters. Irrespective of whether the color separation filters are used, in the direction corresponding to the readout units simultaneously accessed in the configuration in the past, output amplitude characteristics only have to be corrected by adjusting AD conversion gains according to the output amplitude characteristics of the unit pixels 3 present within the repetition unit.

In the embodiments, as an example of the solid-state imaging device that can select and read out signals from the unit pixels according to address control, the CMOS sensor including the pixel unit in which the unit pixels including NMOS or PMOS are arranged in a matrix shape is explained. This is only an example. The generation of signal charges can be applied not only to light but also to electromagnetic waves in general such as an infrared ray, an ultraviolet ray, and an X ray. The matters explained in the embodiments can be applied to a semiconductor device including a unit component in which a large number of elements that receive an electromagnetic wave and output analog signals corresponding to an amount of the electromagnetic wave are arrayed.

In the embodiments, the solid-state imaging device 1 of the area sensor type including the pixel unit 10 in which the unit pixels 3 are arrayed in a two-dimensional matrix shape is explained. However, the arraying in the two-dimensional matrix shape of the unit pixels 3 is not indispensable. For example, the mechanism of the embodiments can also be applied to a so-called line sensor type in which the unit pixels 3 are arrayed for one row or several rows.

Instead of simultaneous readout in the row direction, the pixel signal voltages Vx only has to be read out in order within the repetition unit of an array such as each color separation filter array. AD conversion gains only have to be adjusted to correct output amplitude characteristics of the unit pixels 3 during AD conversion processing of the reference signal comparison type.

The present application contains subject matter related to that disclosed in Japanese Priority Patent Application JP 2008-256267 filed in the Japan Patent Office on Oct. 1, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel unit in which unit pixels that output analog processing target signals are arranged in a horizontal direction and scanning lines are wired such that the analog processing target signals can be read out in order in a vertical direction within a repetition unit of an array of the unit pixels in the horizontal direction;
   a single reference-signal generating unit that generates a reference signal having a gradually changing level, the reference-signal generating unit including one digital to analog (DA) conversion unit;
   an analog to digital (AD) conversion unit including (i) comparing units that compare (a) the reference signal having a gradually changing level supplied from the reference-signal generating unit and (b) the analog processing target signals, and (ii) counter units that receive supply of a count clock for AD conversion and perform count operation in a count operation effective period based on comparison results of the comparing units, the AD conversion unit performing AD conversion processing to acquire digital data of the analog processing target signals on the basis of output data of the counter units; and a driving control unit that (i) performs control to read out the analog processing target signals in order in the vertical direction within the repetition unit of the array of the unit pixels in the horizontal direction of the pixel unit and (ii) is configured to control the reference-signal generating unit and the AD conversion unit during the AD conversion processing such that AD conversion gains indicating size of the output data of the counter units with respect to the analog processing target signals are individually adjusted according to color information of the analog processing target signals in order to correct an output amplitude characteristic difference among the unit pixels within the repetition unit for white balance adjustment during the AD conversion processing, the driving control unit including a communication/timing control unit that controls the reference-signal generating unit and the AD conversion unit based on gain control information that (a) is provided to the communication/timing control unit by a digital processing unit separate from the communication/timing control unit and that (b) indicates a gain value desired to be adjusted for each color.

2. The solid-state imaging device according to claim 1, wherein:

in the pixel unit, the unit pixels that output the analog processing target signals are arranged in a two-dimensional matrix shape, and the reference-signal generating unit supplies the reference signal in common to the comparing units.

3. The solid-state imaging device according to any one of claims 1 and 2, wherein:

any one of color filters of color separation filters including combinations of color filters for plural colors for acquiring the color information is provided on a side on which an electromagnetic wave of each of the unit pixels is made incident in the pixel unit, and the repetition unit of the array of the unit pixels in the horizontal direction of the pixel unit is a repetition unit of an array of the color separation filters.

4. The solid-state imaging device according to claim 3, wherein:

in the pixel unit, the unit pixels that output the analog processing target signals are arranged in a two-dimensional matrix shape, in the color separation filters, color filters of same colors are provided among different rows, and the driving control unit adjusts the AD conversion gains concerning the unit pixels in which the color filters of the same colors are provided to be the same.

5. The solid-state imaging device according to claim 3, wherein:

in the pixel unit, the unit pixels that output the analog processing target signals are arranged in a two-dimensional matrix shape, in the color separation filters, color filters of same colors are provided among different rows, and the driving control unit individually adjusts the AD conversion gains concerning the unit pixels in which the color filters of the same colors are provided.

6. The solid-state imaging device according to claim 1, wherein:

each of the unit pixels includes (i) a detecting unit that detects a change in physical charges, (ii) a pixel-signal generating unit that converts the charges detected by the detecting unit into an image signal, (iii) a transfer unit that transfers the charges detected by the detecting unit to the pixel-signal generating unit on the basis of an input transfer control potential, and (iv) an initializing unit that initializes a potential of the pixel-signal generating unit, the pixel unit includes a unit pixel group having a configuration in which a part of elements in the unit pixel is shared by plural unit pixels, the repetition unit of the array of the unit pixels in the horizontal direction of the pixel unit is a repetition unit of an array in the horizontal direction of the unit pixel group, and the driving control unit individually adjusts the AD conversion gains to correct an output amplitude characteristic difference among the unit pixels included in the unit pixel group.

7. The solid-state imaging device according to any one of claims 1 and 2, wherein the communication/timing control unit controls the reference-signal generating unit to individually adjust a gradient of the reference signal in order to individually adjust the AD conversion gains within the repetition unit.

8. The solid-state imaging device according to any one of claims 1 and 2, wherein the communication/timing control unit includes a clock converting unit that individually adjusts a frequency of the count clock for the AD conversion in order to individually adjust the AD conversion gains within the repetition unit.

9. An analog to digital (AD) conversion gain adjusting method comprising:

performing control by a driving control unit to read out analog processing target signals from unit pixels in a pixel unit in which the unit pixels that output the analog processing target signals are arranged in a horizontal direction, the driving control unit performing control to read out the analog processing target signals in order in a vertical direction within a repetition unit of an array of the unit pixels in the horizontal direction of the pixel unit;

in an analog to digital (AD) conversion unit, (a) comparing, with comparing units, (i) a reference signal having a gradually changing level supplied from a single reference-signal generating unit that includes one digital to analog (DA) conversion unit and (ii) the analog processing target signals, (b) receiving supply of a count clock for AD conversion and performing, with counter units, count operation in a count operation effective period based on a result of the comparison, and (c) acquiring digital data of the analog processing target signals on the basis of output data of the counter units; and controlling by the driving control unit the reference-signal generating unit and the AD conversion unit during AD conversion processing such that AD conversion gains indicating size of the output data of the counter units with respect to the analog processing target signals are individually adjusted according to color information of the analog processing target signals in order to correct an output amplitude characteristic difference among the unit pixels within the repetition unit for white balance adjustment during the AD conversion processing, wherein, the driving control unit includes a communication/timing control unit, the communication/timing control unit controlling the reference-signal generating unit and the AD conversion unit based on gain control information that (a) is provided to the communication/timing control unit by a digital processing unit separate from the communication/timing control unit and that (b) indicates a gain value desired to be adjusted for each color.

10. The solid-state imaging device according to claim 3, wherein the communication/timing control unit controls the reference-signal generating unit to individually adjust a gradient of the reference signal in order to individually adjust the AD conversion gains within the repetition unit.

11. The solid-state imaging device according to claim 6, wherein the communication/timing control unit controls the reference-signal generating unit to individually adjust a gradient of the reference signal in order to individually adjust the AD conversion gains within the repetition unit.

12. The solid-state imaging device according to claim 3, wherein the communication/timing control unit includes a clock converting unit that individually adjusts a frequency of the count clock for the AD conversion in order to individually adjust the AD conversion gains within the repetition unit.

13. The solid-state imaging device according to claim 6, wherein the communication/timing control unit includes a clock converting unit that individually adjusts a frequency of the count clock for the AD conversion in order to individually adjust the AD conversion gains within the repetition unit.

14. The solid-state imaging device according to claim 1, wherein the digital processing unit includes a main control unit that controls the driving control unit.

15. The solid-state imaging device according to claim 14, wherein the main control unit is a camera control unit.

16. The solid-state imaging device according to claim 1, wherein the digital processing unit includes a digital arithmetic unit provided on an output of the AD conversion unit.

17. The AD conversion gain adjusting method according to claim 9, wherein the digital processing unit includes a main control unit that controls the driving control unit.

18. The AD conversion gain adjusting method according to claim 17, wherein the main control unit is a camera control unit.

19. The AD conversion gain adjusting method according to claim 9, wherein the digital processing unit includes a digital arithmetic unit provided on an output of the AD conversion unit.

* * * * *